United States Patent
Kaiser et al.

(10) Patent No.: US 8,077,079 B2
(45) Date of Patent: Dec. 13, 2011

(54) RADIOLOCATION USING PATH LOSS DATA

(75) Inventors: Daryl A. Kaiser, Los Gatos, CA (US); Kirshnam Raju V. Datla, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1801 days.

(21) Appl. No.: 11/268,030

(22) Filed: Nov. 7, 2005

(65) Prior Publication Data

US 2006/0069526 A1    Mar. 30, 2006

Related U.S. Application Data

(63) Continuation of application No. 10/629,384, filed on Jul. 28, 2003, now Pat. No. 6,990,428.

(51) Int. Cl.
*G01S 7/40* (2006.01)
(52) U.S. Cl. ............... 342/174; 342/450; 455/456.1; 455/67.11
(58) Field of Classification Search ............. 702/150; 342/450, 174; 455/67.11, 456.1; 709/224
See application file for complete search history.

(56) References Cited

U.S. PATENT DOCUMENTS

| | | | |
|---|---|---|---|
| 4,254,467 A | 3/1981 | Davis et al. | 345/443 |
| 5,028,848 A | 7/1991 | Bankston et al. | 315/364 |
| 5,327,144 A | 7/1994 | Stilp et al. | 342/387 |
| 5,375,140 A | 12/1994 | Bustamante et al. | 375/1 |
| 5,394,158 A | 2/1995 | Chia | 342/457 |
| 5,396,582 A | 3/1995 | Kahkoska | 358/1.3 |
| 5,564,079 A | 10/1996 | Olsson | 455/54.1 |
| 5,570,412 A | 10/1996 | LeBlanc | 379/58 |

(Continued)

FOREIGN PATENT DOCUMENTS

EP    0 930 514 A2    7/1999
(Continued)

OTHER PUBLICATIONS

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

(Continued)

*Primary Examiner* — John Sotomayor
(74) *Attorney, Agent, or Firm* — Dov Rosenfeld; INVENTEK

(57) ABSTRACT

Determining the location of a station or potential rogue access point in a wireless network including accepting an ideal path loss model and calibrating the ideal model using path loss measurements between access points at known locations. The calibrating determines a calibrated path loss model between the access points. The method further includes determining path losses between the wireless station of unknown location and at least some of the access points. In the case the wireless station is a client station, the determining includes receiving measurements from the wireless station of unknown location measuring the received signal strengths as a result of respective transmissions from at least some of the access points at known respective transmit powers. In the case the wireless station is an potential rogue access point, the determining includes receiving measurements from at least some of the access points measuring the received signal strength at each of the access points resulting from transmission by the potential rogue access point for each of a set of assumed transmit powers for the potential rogue. The method further includes determining the likely location or locations of the wireless station using the measured path loss and the calibrated path loss model.

25 Claims, 12 Drawing Sheets

U.S. PATENT DOCUMENTS

| | | | |
|---|---|---|---|
| 5,666,662 A | 9/1997 | Shibuya | 455/456.4 |
| 5,717,406 A | 2/1998 | Sanderford et al. | 342/457 |
| 5,732,354 A | 3/1998 | MacDonald | 455/456.2 |
| 5,945,948 A | 8/1999 | Buford et al. | 342/457 |
| 6,112,095 A | 8/2000 | Wax et al. | 455/456 |
| 6,115,605 A | 9/2000 | Siccardo et al. | 455/426 |
| 6,134,338 A | 10/2000 | Solberg et al. | 382/113 |
| 6,134,448 A | 10/2000 | Shoji et al. | 455/456 |
| 6,140,964 A | 10/2000 | Sugiura et al. | 342/464 |
| 6,167,274 A | 12/2000 | Smith | 455/456.3 |
| 6,198,935 B1 | 3/2001 | Saha et al. | 455/456 |
| 6,212,391 B1 | 4/2001 | Saleh et al. | 455/456 |
| 6,226,400 B1 | 5/2001 | Doll | 382/163 |
| 6,236,365 B1 | 5/2001 | LeBlanc et al. | 342/457 |
| 6,243,811 B1 | 6/2001 | Patel | 713/167 |
| 6,249,252 B1 | 6/2001 | Dupray | 342/450 |
| 6,259,406 B1 | 7/2001 | Sugiura et al. | 342/457 |
| 6,269,246 B1 | 7/2001 | Rao et al. | 455/456 |
| 6,272,541 B1 | 8/2001 | Cromer et al. | 709/224 |
| 6,275,190 B1 | 8/2001 | Sugiura et al. | 342/464 |
| 6,282,427 B1 | 8/2001 | Larsson et al. | 455/456 |
| 6,304,218 B1 | 10/2001 | Sugiura et al. | 342/464 |
| 6,317,599 B1 | 11/2001 | Rappaport et al. | 455/446 |
| 6,317,604 B1 | 11/2001 | Kovach, Jr. et al. | 455/456.5 |
| 6,414,634 B1 | 7/2002 | Tekinay | 342/453 |
| 6,415,155 B1 | 7/2002 | Koshima et al. | 455/456 |
| 6,441,777 B1 | 8/2002 | McDonald | 342/357.06 |
| 6,456,892 B1 | 9/2002 | Dara-Abrams et al. | 700/83 |
| 6,473,038 B2 | 10/2002 | Patwari et al. | 342/450 |
| 6,526,283 B1 | 2/2003 | Jang | 455/456 |
| 6,556,942 B1 | 4/2003 | Smith | 702/150 |
| 6,581,000 B2 | 6/2003 | Hills et al. | 701/207 |
| 6,664,925 B1 | 12/2003 | Moore et al. | 342/451 |
| 6,674,403 B2 | 1/2004 | Gray et al. | 342/463 |
| 6,704,352 B1 | 3/2004 | Johnson | 375/224 |
| 6,728,782 B1 | 4/2004 | D'Souza et al. | 709/242 |
| 6,754,488 B1 | 6/2004 | Won et al. | 455/424 |
| 6,766,453 B1 | 7/2004 | Nessett et al. | 713/171 |
| 6,799,047 B1 | 9/2004 | Bahl et al. | 455/456.1 |
| 6,804,394 B1 | 10/2004 | Hsu | 382/173 |
| 6,810,428 B1 | 10/2004 | Larsen et al. | 709/238 |
| 6,850,946 B1 | 2/2005 | Rappaport et al. | 707/101 |
| 6,990,428 B1 * | 1/2006 | Kaiser et al. | 702/150 |
| 7,123,924 B2 | 10/2006 | Cuffaro | 455/456.1 |
| 7,293,088 B2 * | 11/2007 | Douglas et al. | 709/224 |
| 7,558,852 B2 * | 7/2009 | Douglas et al. | 709/224 |
| 2002/0036569 A1 | 3/2002 | Martin | 340/573.1 |
| 2002/0045424 A1 | 4/2002 | Lee | 455/41.2 |
| 2002/0102988 A1 | 8/2002 | Myllymaki | 455/456 |
| 2002/0115445 A1 | 8/2002 | Myllymaki | 455/456 |
| 2002/0118118 A1 | 8/2002 | Myllymaki et al. | 340/686.1 |
| 2002/0154134 A1 | 10/2002 | Matsui | 345/582 |
| 2002/0168958 A1 | 11/2002 | Ford et al. | 455/404 |
| 2002/0174335 A1 | 11/2002 | Zhang et al. | 713/168 |
| 2002/0176366 A1 | 11/2002 | Ayyagari et al. | 370/245 |
| 2003/0117985 A1 | 6/2003 | Fujii et al. | 370/338 |
| 2003/0130987 A1 | 7/2003 | Edlund et al. | 707/3 |
| 2003/0135486 A1 | 7/2003 | Edlund et al. | 707/3 |
| 2003/0135762 A1 | 7/2003 | Macaulay | 713/201 |
| 2004/0066757 A1 | 4/2004 | Molteni et al. | 370/329 |
| 2004/0072577 A1 | 4/2004 | Myllymaki et al. | 455/456.1 |
| 2004/0111397 A1 | 6/2004 | Chen et al. | 707/3 |
| 2004/0151377 A1 | 8/2004 | Boose et al. | 382/193 |
| 2004/0166878 A1 | 8/2004 | Erskine et al. | 455/456.1 |
| 2004/0176108 A1 | 9/2004 | Misikangas | 455/456.5 |
| 2004/0186847 A1 | 9/2004 | Rappaport et al. | 707/101 |
| 2004/0198373 A1 | 10/2004 | Ford et al. | 455/456.1 |
| 2004/0198392 A1 | 10/2004 | Harvey et al. | 455/456.1 |
| 2004/0203910 A1 | 10/2004 | Hind et al. | 455/456.1 |
| 2004/0236547 A1 | 11/2004 | Rappaport et al. | 703/2 |
| 2004/0259554 A1 | 12/2004 | Rappaport et al. | 455/446 |
| 2004/0259555 A1 | 12/2004 | Rappaport et al. | 455/446 |
| 2005/0128139 A1 | 6/2005 | Misikangas et al. | 342/350 |
| 2005/0131635 A1 | 6/2005 | Myllymaki et al. | 701/205 |
| 2005/0136944 A1 | 6/2005 | Misikangas et al. | 455/456.1 |
| 2005/0185615 A1 | 8/2005 | Zegelin | 370/331 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 97/33386 | 9/1997 |
| WO | WO 98/41048 | 9/1998 |
| WO | WO 99/08909 | 12/1999 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Assessing Wireless Security with AiroPeek and AiroPeek NX." A WildPackets Academy Tutorial from www.wildpackets.com, WildPackets Inc., Walnut Creek, CA. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

"Location Determination Papers", List of publications maintained by Moustafa A. Youssef, Department of Computer Science, University of Maryland, College Park, MD 20742. Available online, and downloaded Feb. 9, 2006 at http://www.cs.umd.edu/~moustafa/location_papers.htm.

"Positioning in Wireless Networks Reference" BINARY Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "LANDMARC: Indoor Location Sensing Using Active RFID." Proceedings of the First IEEE International Conference of Pervasive Computing and Communications 2003 (PerCom '03).

G. Wolfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models." European Wireless, 2002, Florence, Italy.

P. Bahl, V.N. Padmanabhan and A. Balachandran, "A Software System for Locating Mobile Users: Design, Evaluation and Lessons," Microsoft Research Technical Report MSR-TR-2000-12, Feb. 2000.

Steven Fortune, "Algorithms for Prediction of Indoor Radio Propagation,"Proceedings of 48th IEEE Vehicular Technology Conference 98, Jan. 7, 1998. Bell Laboratories, Murray Hill, NJ 07974.

A. Rajkumar, B. F . Naylor, F. Feisullin and L. Rogers, "Predicting RF Coverage in Large Environments using Ray-Beam Tracing and Partitioning Tree Represented Geometry," submitted to the ACM Journal of Wireless Networks after revision on Oct. 12, 1995, AT&T Bell Laboratories, Murray Hill, NJ 07974.

R.A. Valenzuela, S. Fortune and J. Ling, "Indoor Propagation Prediction Accuracy and Speed Versus Number of Reflections in Image- Based 3-D Ray-Tracing," Vehicular Technology Conference, 1998. Bell Laboratories, Lucent Technologies, Holmdel, NJ 07733.

"Ekahau Logical Areas-location enabling the Wi-Fi network." Apr. 4, 2003. Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.Pdf.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Wireless Valley, Austin, TX. URL: http://www.wirelessvalley.com/Assets/brochures/LanFielder.pdf.

Conley, C.. "Securing WLANS with Location-Enabled Networks." *Wireless Security Perspectives*, vol. 5,No. 3.Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http:://www.wherenet.com/ WhereNet, Santa Clara, CA.

Small, J., Smailagic; A., and Siewiorek, D.P. "Determining User Location for Context Aware Computing Through the Use of a Wireless LAN Infrastructure." Institute for Complex Engineered Systems. Carnegie-Mellon University, Pittsburgh, PA, 2000. Available at http://www-2.cs.cmu.edu/-aura/docdir/small00.pdf.

Bahl, P. and Padmanabhan, V.N. "RADAR: An In-Building RF-based User Location and Tracking System." IEEE Infocom 2000, vol. 2, Mar. 2000, pp. 775-784.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs444n/paper.pdf.

"Positioning in Wireless Networks Reference." Downloaded on Jul. 28, 2005 from http://binary.engin.brown.edu/. BINARY Group, Division of Engineering, Brown University, Providence, RI. Available online at http://binary.engin.brown.edu/publication/Positioning_Ref.pdf.

* cited by examiner

RADIOLOCATION USING PATH LOSS DATA

RELATED PATENT APPLICATIONS

The present application is a continuation of U.S. patent application Ser. No. 10/629,384 filed on Jul. 28, 2003 now U.S. Pat. No. 6,990,428 titled RADIOLOCATION USING PATH LOSS DATA. The contents of U.S. patent application Ser. No. 10/629,384 are incorporated herein by reference.

The present application is related to U.S. Provisional Patent Application Ser. No. 60/490,847 S/N titled "A METHOD, APPARATUS, AND SOFTWARE PRODUCT FOR DETECTING ROGUE ACCESS POINTS IN A WIRELESS NETWORK" to inventors Tolson, et al., assigned to the assignee of the present invention, and incorporated herein by reference.

BACKGROUND

The present invention is related to wireless networks, and in particular to determining the location of wireless stations in a wireless network.

Use of wireless networks such as wireless local area networks (WLANs) is becoming widespread. Locating radios in a wireless communication system such as a WLAN enables new and enhanced features, such as location-based services and location-aware management. Location-based services include, for example, assigning the correct, e.g., closest printer to a wireless station of a WLAN.

A WLAN may be ad hoc, in that any station may communicate directly with any other station, or have an infrastructure in which a station (called a "client station" or simply a "client") can only communicate via an access point (AP)—a station that acts as a base station for a set of clients. The access point is typically coupled to other networks that may be wired or wireless, e.g., to the Internet or to an intranet. That wider network is called the "wired" network herein, and it is to be understood that this wired network may be an internetwork that includes other wireless networks.

WLAN management applications of radiolocation include the location of client stations and the location of rogue access points. See for example, concurrently filed incorporated-by-reference U.S. Provisional Patent application Ser. No. 60/490,847 titled "A METHOD, APPARATUS, AND SOFTWARE PRODUCT FOR DETECTING ROGUE ACCESS POINTS IN A WIRELESS NETWORK" to inventors Olson, et al., for more details of the latter application and how radiolocation may be used to aid rogue access point detection.

A number of techniques have been proposed for radiolocation. Prior art methods are known that rely on the Global Positioning System (GPS). GPS, however, is known to have poor indoor reception and long acquisition time. GPS also requires additional GPS hardware in the wireless station that would increase the cost of stations, e.g., client devices.

Prior art methods also are known that rely on time difference of arrival (TDOA) estimation. Such methods require relatively precise time synchronization at each station, which in turn requires non-standard hardware that differs from that in today's WLAN stations, e.g., stations that conform to the IEEE 802.11 standard.

Prior art methods also are known for WLANs that use signal strength measurements using existing mobile station hardware. Such methods, however, require training that in turn requires taking time-consuming signal strength measurements at numerous locations by a cooperative mobile client station.

A prior art method also is known for WLANs that uses RF modeling. The modeling, however, requires detailed input of building layout, wall location, and construction materials.

Thus, there is a need for a method for radiolocation using available signal strength measurements at wireless stations that does need additional hardware in addition to regular radio hardware, and that requires relatively little training. There further is a need for a radiolocation method wherein the training can be accomplished automatically by each infrastructure access point.

SUMMARY

Disclosed herein is a method, apparatus, and software product for radiolocation using measurements at wireless stations of a wireless network that requires relatively little "training," e.g., relatively little calibrating. The invention is particularly useful in WLAN applications. One aspect of the invention is that the training can be accomplished automatically by each access point collecting signal strength measurements to/from other detectable access points. In one WLAN embodiment, the training measurements may be the same as those collected by each access point to drive other features, such as managed deployment.

Thus, disclosed herein is a method, an apparatus, and a carrier medium to determine the location of a wireless station of a wireless network. The wireless station may be a client station or a potential rogue access point. The method includes accepting an ideal path loss model and calibrating the ideal path loss model using path loss measurements between a first set and a second set of wireless stations of the wireless network in an area of interest. The stations of the first and second sets are at known locations. The path loss measurements are obtained using measurements received from the first set of wireless stations that measure the received signal strengths at each of the respective wireless station of the first set as a result of transmissions by each wireless station of the second set of wireless stations of the wireless network. Each transmission by a respective station of the second set is at a known respective transmit power. In one embodiment, the first and second sets are identical, and are a set of managed access points of a managed wireless network located in the area of interest. The calibrating determines a calibrated path loss model between the access points. By a managed access point is meant an access points at a known location whose transmit power is known and whose received signal strength is measurable.

The method further includes measuring the path loss between the wireless station of an unknown location and at least some of the managed access points.

In the case the wireless station is a client station of one of the managed access points, the measuring includes receiving measurements from the client station measuring the received signal strength as a result of respective transmissions from at least some of the access points, each of the respective transmissions being at a known corresponding transmit power.

In the case the wireless station is a potential rogue access point, the measuring includes receiving measurements from at least some of the access points of the wireless network measuring the received signal strength at each of these access points resulting from transmission of a signal from the potential rogue access point for each of a set of assumed transmit powers for the potential rogue access point. The method further includes determining the likely location or locations of the wireless station using the measured path loss and the calibrated path loss model.

A variant for radiolocating a potential rogue uses signals received at one or more client stations. The client stations are first located using the radiolocation method.

DETAILED DESCRIPTION

Figure 1:
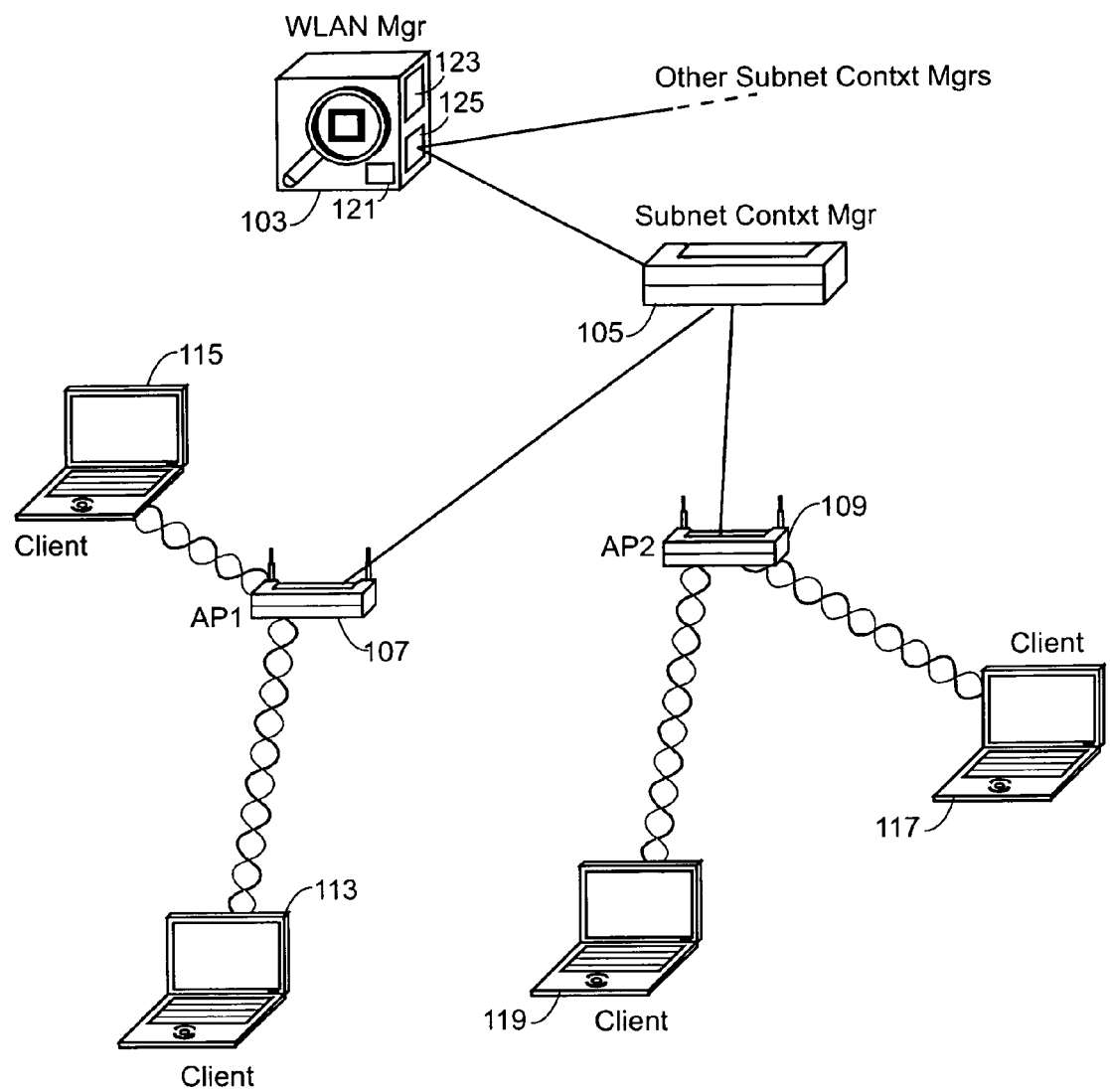
FIG. 1 shows one example of a network in which the present invention operates, including a management entity called the WLAN manager.

One embodiment of the present invention is a method of determining the likely location or locations of a receiving wireless station using signal strength measurements of signals from one or more transmitting stations whose transmitting power is known to provide path loss measurements. The path loss measurements are used together with predicted path losses at a set of locations as predicted by a calibrated path loss model that uses an ideal path loss model modified by a relatively small set of measurements based on transmitting and receiving at a relatively small set of known locations.

Another embodiment of the invention is a method of locating a transmitter transmitting at an unknown power level. Such a transmitter may be a rogue AP. The transmissions are received at one or more stations whose locations are known or estimated.

The Managed Wireless Network and Radio Measurements

One embodiment of the invention operates in a managed wireless network in which the APs and their clients are managed by a central management entity. One embodiment of the managed wireless network substantially conforms to the IEEE 802.11 standard. By substantially conforming we mean compatible with. Some aspects of the IEEE 802.11 standard are modified slightly to accommodate some management aspects used in the invention. In particular, for some aspects of the invention, additional MAC frames are assumed. Furthermore, stations of the network measure the received signal strength relatively accurately.

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client station roaming patterns; the real time roaming requirements; and the physical constraints of the network (e.g. campus, building, and so forth.).

In this description, we assume a single management entity we call the WLAN Manager. Management entities we called Subnet Context Managers may be included, each controlling some aspects of a single subnet or virtual local area network (VLAN). A Subnet Context Manager, for example, may relay instructions from the WLAN manager to all managed APs in its subset or VLAN. In some embodiments, the functions of the subnet context manager are carried out at a higher level, e.g., at the same level as the WLAN Manager. Other embodiments may have a different number of levels in the hierarchy with different levels of management. For example, in some embodiments, the functions of the subnet context manager are carried out at a higher level, e.g., at the same level as the WLAN Manager. For more information on radio management, see above-mentioned U.S. Provisional Patent Application Ser. No. 60/490,847 titled "A METHOD, APPARATUS, AND SOFTWARE PRODUCT FOR DETECTING ROGUE ACCESS POINTS IN A WIRELESS NETWORK" to inventors Olson, et al., assigned to the assignee of the present invention, and incorporated herein by reference.

The WLAN Manager manages several aspects of the wireless network, e.g., security, and in one embodiment, authorizes a set of access points in the network—we call these the managed access points—including maintaining a database called the Configuration Database that contains configuration parameters. The Configuration Database also includes an AP database that includes information on the managed APs, e.g., a list of the managed APs together with some data related to these APs, such as the location of the APs and the power the APs are set to transmit at. A single WLAN Manager is typically deployed to handle all the wireless clients within the enterprise campus. The WLAN Manager provides centralized control of various aspects of the radio environment within a given set of APs, including the measurement aspects of the present invention and the radiolocation aspects of the present invention. The WLAN Manager provides the ability to determine network wide radio parameters during initial network deployment and network expansion. In one embodiment, the WLAN Manager selects certain radio parameter values to provide an adequate radio environment. In one embodiment, the WLAN Manager further centrally coordinates all client and AP measurements.

Thus, aspects of the invention are implemented on the WLAN Manager and use measurements made under control of the WLAN manager. However, the invention does not require there to be a single WLAN Manager entity. The functionality described herein may be incorporated into any of other management entities, e.g., at a local level, or by a separate manager called the Radio Manager that controls the radio aspects of the WLAN. Furthermore, any of these management entities may be combined with other functionalities, e.g., switching, routing, and so forth.

A simple managed network is shown in FIG. 1. All managers are assumed incorporated into a single management entity—the WLAN Manager—that has access to the AP Database. It is to be understood that the WLAN Manager incorporates the functions of the Radio Manager.

FIG. 1 shows a WLAN manager 103 that includes a processing system 123 with one or more processors and a memory 121. The memory 121 includes instructions that cause one or more processors of the processing system 123 to implement the aspects of the present invention that are implemented in the WLAN Manager. The WLAN manager 103 includes a network interface 125 for coupling to a network, typically wired. In one embodiment, the WLAN manager is part of a network switch and operated under a network operating system, in this case IOS (Cisco Systems, Inc., San Jose, Calif.).

The WLAN Manager 103 is coupled via its network interface 125 and a network (typically a wired network) to a set of Subnet Context Managers. One such Subnet Context Manager is shown as element 105 in FIG. 1. All managed APs in a subnet register with a Subnet Context Manager. For example, in FIG. 1, the APs named AP1 and AP2 (107 and 109, respectively) each are part of the same subnet and have a network connection to Subnet Context Manager 105. Any management communication between the WLAN Manager 103 and APs 107 and 109 is then via the Subnet Context Manager 105.

A client station associates with an AP. Thus, in FIG. 1, APs 107 and 109 each are shown with associated clients 113, 115, and 117, 119, respectively. By a managed client we mean a client that associates with a managed AP. Thus, clients 113, 115, 117, and 119 are managed clients.

A wireless network uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

Aspects of the invention use data from and/or about beacons and probe responses received at APs and/or client stations. The WLAN Manager 103 manages the obtaining and receiving of such data. The beacons and probe response information is used to determine the path loss between stations that are at known locations.

Figure 2:
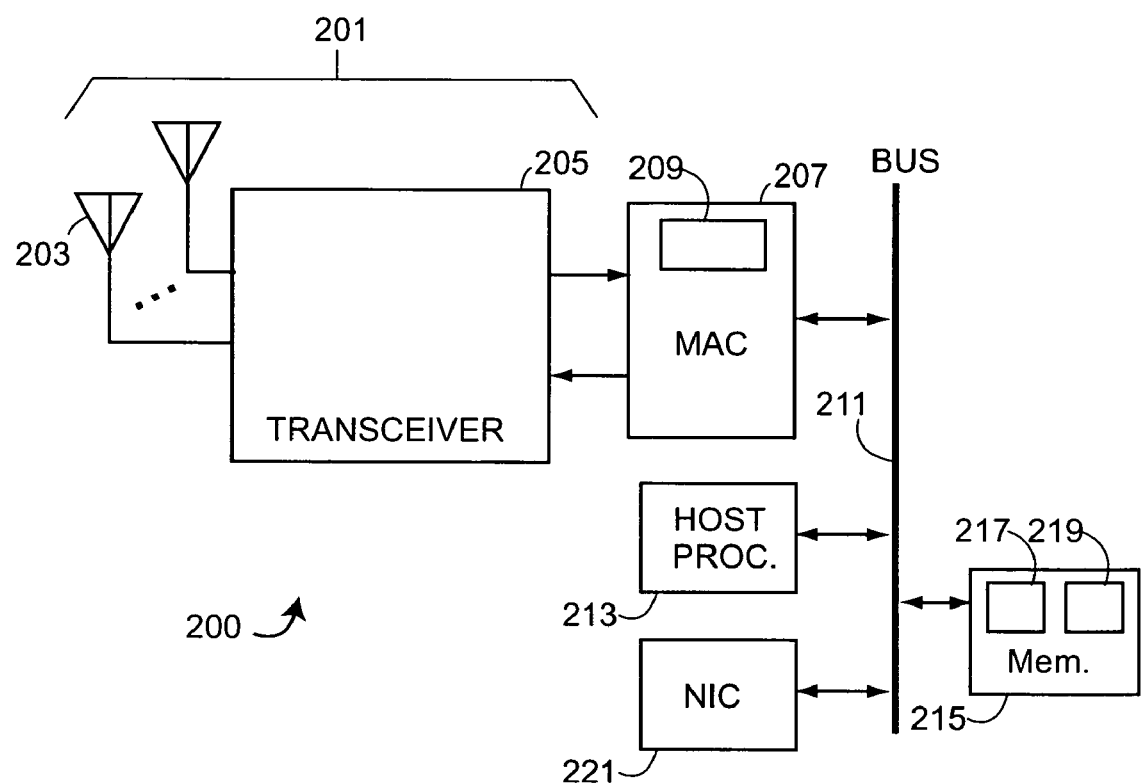
FIG. 2 shows a simple block diagram of one embodiment of a wireless station that may be an AP or a client station and that implements one or more aspects of the invention.

FIG. 2 shows one embodiment of a wireless station 200 that may be an AP or a client station and that implements one or more aspects of the invention. While a wireless station such as station 200 is generally prior art, a wireless station that includes aspects of the present invention, e.g., in the form of software, is not necessarily prior art. The radio part 201 includes one or more antennas 203 that are coupled to a radio transceiver 205 including an analog RF part and a digital modem. The radio part thus implements the physical layer (the PHY). The digital modem of PHY 201 is coupled to a MAC processor 207 that implements the MAC processing of the station. The MAC processor 207 is connected via one or more busses, shown symbolically as a single bus subsystem 211, to a host processor 213. The host processor includes a memory subsystem, e.g., RAM and/or ROM connected to the host bus, shown here as part of bus subsystem 211. Station 200 includes an interface 221 to a wired network.

In one embodiment, the MAC processing, e.g., the IEEE 802.11 MAC protocol is implemented totally at the MAC processor 207. The Processor 207 includes a memory that stored the instructions for the MAC processor 207 to implement the MAC processing, and in one embodiment, some or all of the additional processing used by the present invention. The memory is typically but not necessarily a ROM and the software is typically in the form of firmware.

The MAC processor is controlled by the host processor 213. In one embodiment, some of the MAC processing is implemented at the MAC processor 207, and some is implemented at the host. In such a case, the instructions for the host 213 to implement the host-implemented MAC processing are stored in the memory 215. In one embodiment, some or all of the additional processing used by the present invention is also implemented by the host. These instructions are shown as part 217 of memory.

According to one aspect of the invention, each station such as station 200 maintains a database of the beacons and probe responses it receives, called a beacon database. Beacons and probe responses are stored in the database under one or more circumstances, e.g., when the station determines whether or not to associate with an AP, or upon request, e.g., from the WLAN manager to listen for beacons and probe responses on its serving channel (what we call a passive scan), or upon request, e.g., from the WLAN manager to temporarily mode to another channel and listen for beacons and probe responses after sending a probe request (what we call an active scan). In the context of aspects of the present invention, beacons and probe responses received at the station are stored in the beacon database. We call this database the Beacon Table. As shown in FIG. 2, in one embodiment, the Beacon Table 219 is in the memory 215 of the station. Other embodiments store the Beacon Table 219 outside of memory 215. A station stores the information in the beacons and probe responses in its Beacon Table 219, and further stores additional information about the state of the station when it receives the beacon.

The information stored in the beacon database 219 includes the information in the beacon/probe response, and, according to one embodiment of the invention, the RSSI detected at the PHY of the receiver of the beacon/probe response.

The components of radio management include radio measurement in managed APs and their clients. One embodiment uses the 802.11 h proposal that modifies the MAC protocol by adding transmission power control (TPC) and dynamic frequency selection (DFS). TPC limits the transmitted power to the minimum needed to reach the furthest user. DFS selects the radio channel at an AP to minimize interference with other systems, e.g., radar.

Another embodiment uses a protocol that differs from the presently proposed 802.11 protocol by providing for tasking at the AP and, in turn, at a client to autonomously make radio measurements according to a schedule. In one embodiment, the information reported includes, for each detected AP, information about the detection, and information about or obtained from contents of the beacon/probe response.

While the IEEE 802.11 standard specifies that a relative RSSI value be determined at the physical level (the PHY), one aspect of the invention uses the fact that many modern radios include a PHY that provides relatively accurate absolute RSSI measurements. Thus, the reports include the RSSI detected at the PHY of the receiver of the received beacon/probe response. In one embodiment, RSSIs detected at the PHYs are used to determine location information from path loss.

One embodiment uses a protocol we call the WLAN Manager-to-AP Measurement Protocol. According to this protocol, the WLAN Manager can send a message we call a Measurement Request Message to, and receives report messages we call Measurement Report Messages from one or more managed APs, either directly, or via one or more Subnet Context Managers. The messages can be encapsulated in Ethernet frames or UDP/TCI/IP packets. In one embodiment, Ethernet is used between a Subnet Context Manager and an AP, while IP encapsulation is used for inter-subnet messages.

The AP receiving the Measurement Request Message schedules the actual measurements.

In the case that the Measurement Request Message includes a schedule for one or more clients, the AP translates the Measurement Request Message into a measurement request for each client. In one embodiment, the measurement communication between the APs and clients uses MAC frames that conform to a modification of the IEEE 802.11 standard MAC protocol we call the AP-to-client Measurement MAC Protocol herein. The AP-to-client Measurement MAC Protocol includes IEEE 802.11 standard frames, some of which are modified to include additional information that may be used by one or more embodiments of the invention. Any standard type MAC frames that conform to the AP-to-client Measurement MAC Protocol include an indication of such conformity. For example, an association request frame includes an element that indicated whether or not the station supports radio management including the ability to carry out and report the client measurements described herein. A beacon frame and a probe frame that conform to the AP-to-client Measurement MAC Protocol may include the transmit power of the AP transmitting the frame.

A frame we call the Measurement Request Frame from the AP requests an active or passive scan by a client at a scheduled scan time with a report at a scheduled reporting time. A frame we call the Measurement Report Frame from the client provides a report in response to a Measurement Request Frame. The Report frame includes the MAC address of the station providing the report, the identifier from the corresponding Measurement Request Frame, and one or more measurement elements.

An AP receiving a Measurement Request Message periodically sends a Measurement Report Message that includes reports from each station performing a measurement. The report part for each station includes the type of station performing the measurement (AP, client, and so forth), the MAC of the measuring station, and the actual measurement data. Aspects of this invention use reports of beacons and probe responses received at a station that in one embodiment includes the received signal strength (RSSI), e.g., in dBm, the channel, the measurement duration, the BSSID, and other information in the beacon/probe response and of the station receiving the beacon/probe response.

Locating Client Stations

One aspect of the invention is a method to determine the location of a client station that receives signals from managed APs whose location is known. Another aspect of the invention, described below, is a method to locate a potential rogue AP whose beacons or probe responses are received by one or more managed APs and/or one or more clients of one or more managed APs. In either case, the approximate location, e.g., to the nearest floor of a building is assumed known. For example, one aspect f the invention assumes a station receiving beacon or probe response from a managed AP is within radio range of the managed AP whose location is known. Similarly, in the case of rogue AP detection, when a beacon or probe response from a potential rogue AP is received by a managed AP or a client of a managed AP (a managed client), and the location of the managed AP is known, then the approximate location of the potential rogue AP is known, e.g., to within radio range of the managed AP in the case the managed AP received the beacon or probe response, or double that range in the case of a managed client receiving the beacon or probe request, assuming a client and AP have approximately the same range.

Thus the method, implemented in the WLAN manager, assumes a model of the region where the unknown location exists, e.g., a floor of a building. The locations of any managed APs in the overall region also are known and provided to the method.

In one embodiment, the overall area of interest, e.g., a floor of a building, is divided into small area elements. In one embodiment, these are hexagonal regions, and in another, they are small rectangular regions. The description herein uses 10 ft by 10 ft square regions.

Figure 3A:
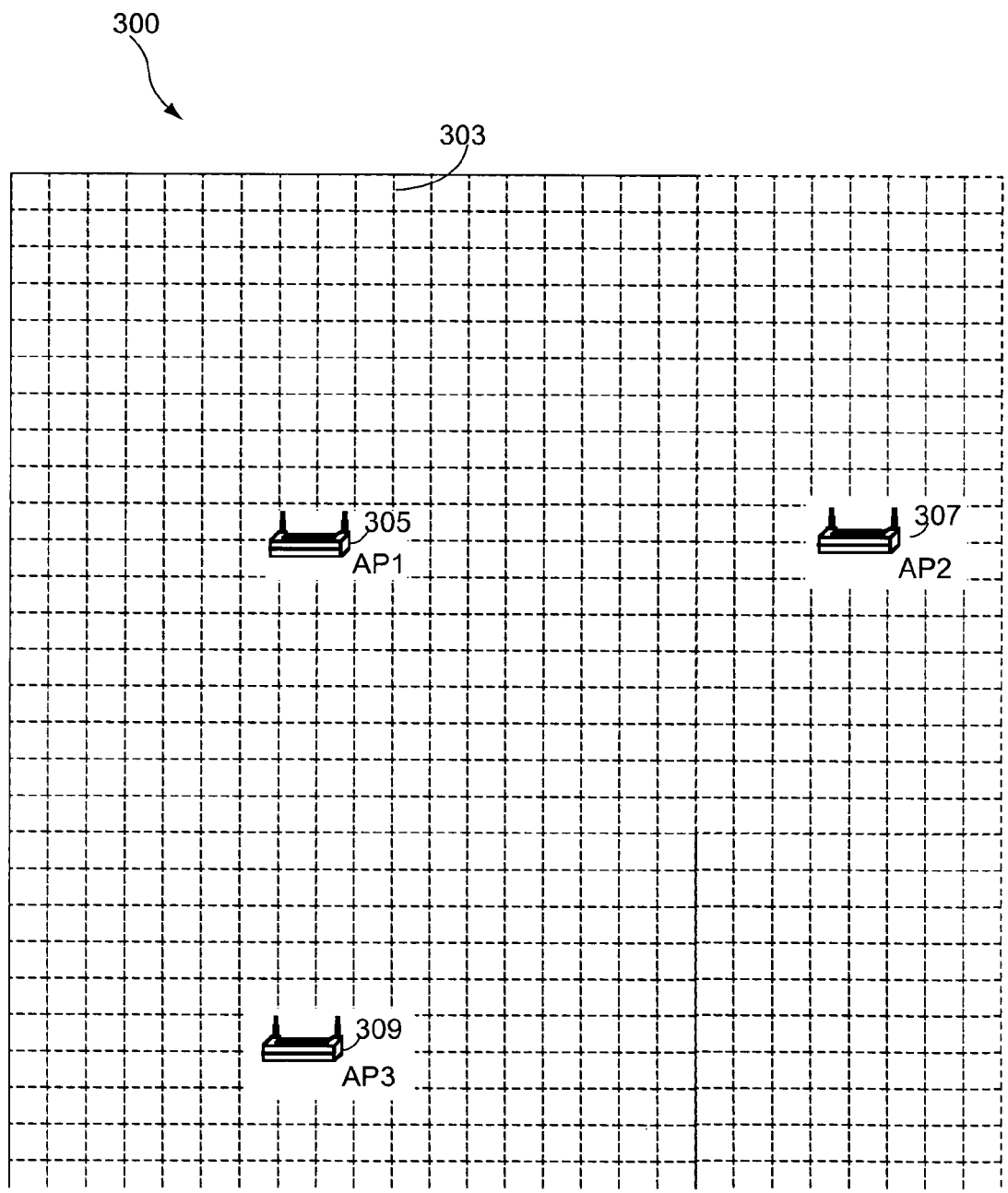
FIG. 3A shows one user interface that includes a graphic overlay of a grid of area elements, in this embodiment each a small square region.

One embodiment of the invention builds a user interface that includes the locations of known access points in the area of interest. FIG. 3A shows one user interface 300 that includes a graphic overlay 303 of a grid of area elements, in this embodiment each a small square (10 ft by 10 ft) region. User interface 300 includes a graphic representation indicating the location of three managed APs, shown as AP1 (305), AP2 (307) and AP3 (309).

Figure 3B:
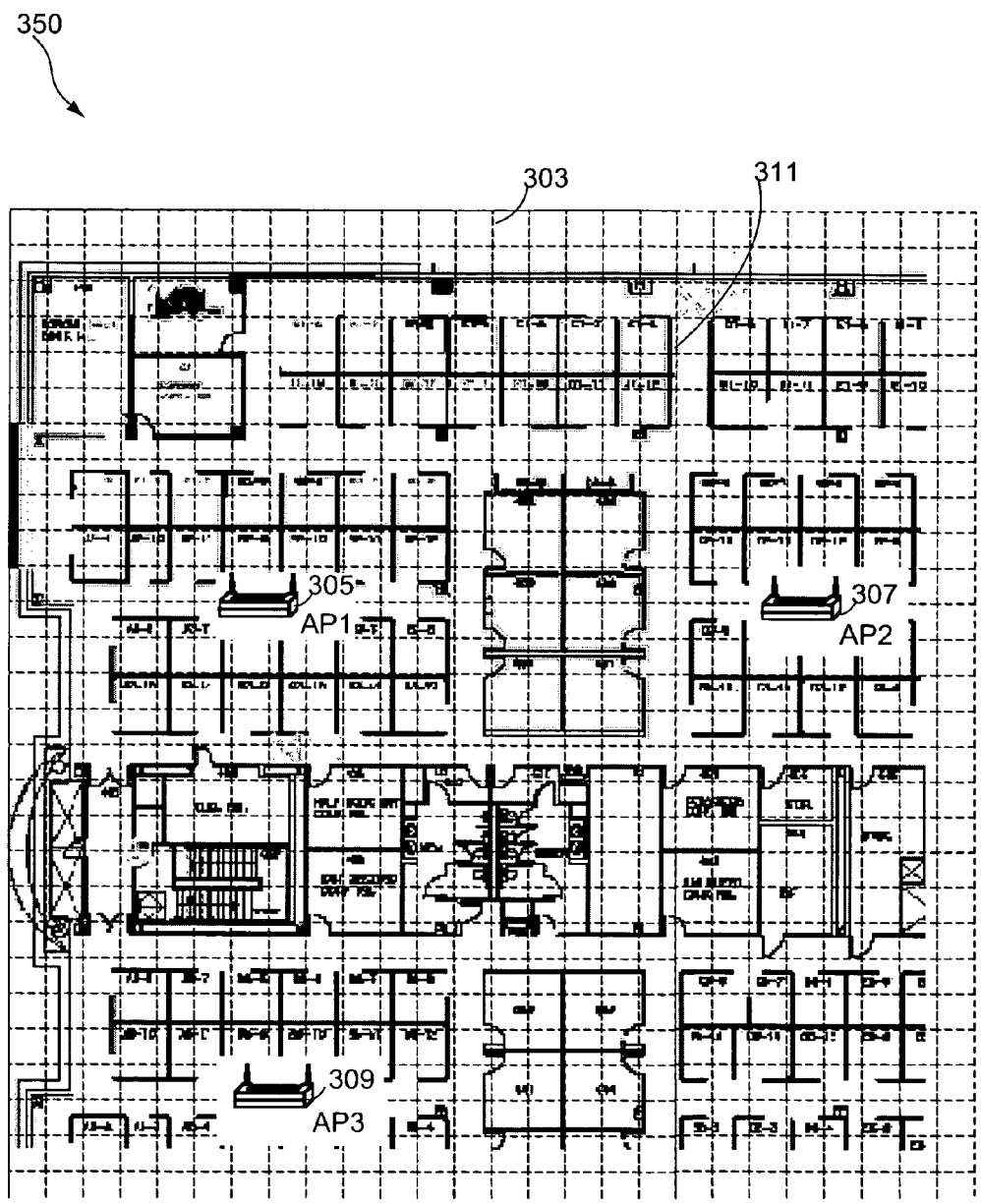
FIG. 3B shows another user interface that includes a grid, a representation indicating the location of the managed APs, and a graphic overlay representing an architectural plan of a floor of a building.

FIG. 3B shows another user interface 350 that includes in addition to the graphic overlay 303 of the grid and the representation indicating the location of the managed APs 305, 307, and 309, a graphic overlay 311 representing the architectural structure, e.g., as an architectural plan of the interior, e.g., the floor of the building. Another user interface (not illustrated) shows the graphic representation of the floor architecture, but no grid.

Thus, the user of the WLAN manager can view the location of the APs on a two-dimensional screen. In one embodiment, the WLAN manager may include software that provides an interactive mechanism for the user to place access points, e.g., by pointing to and dragging AP icons on the 2-D overlay 350 of the floor.

Figure 4:
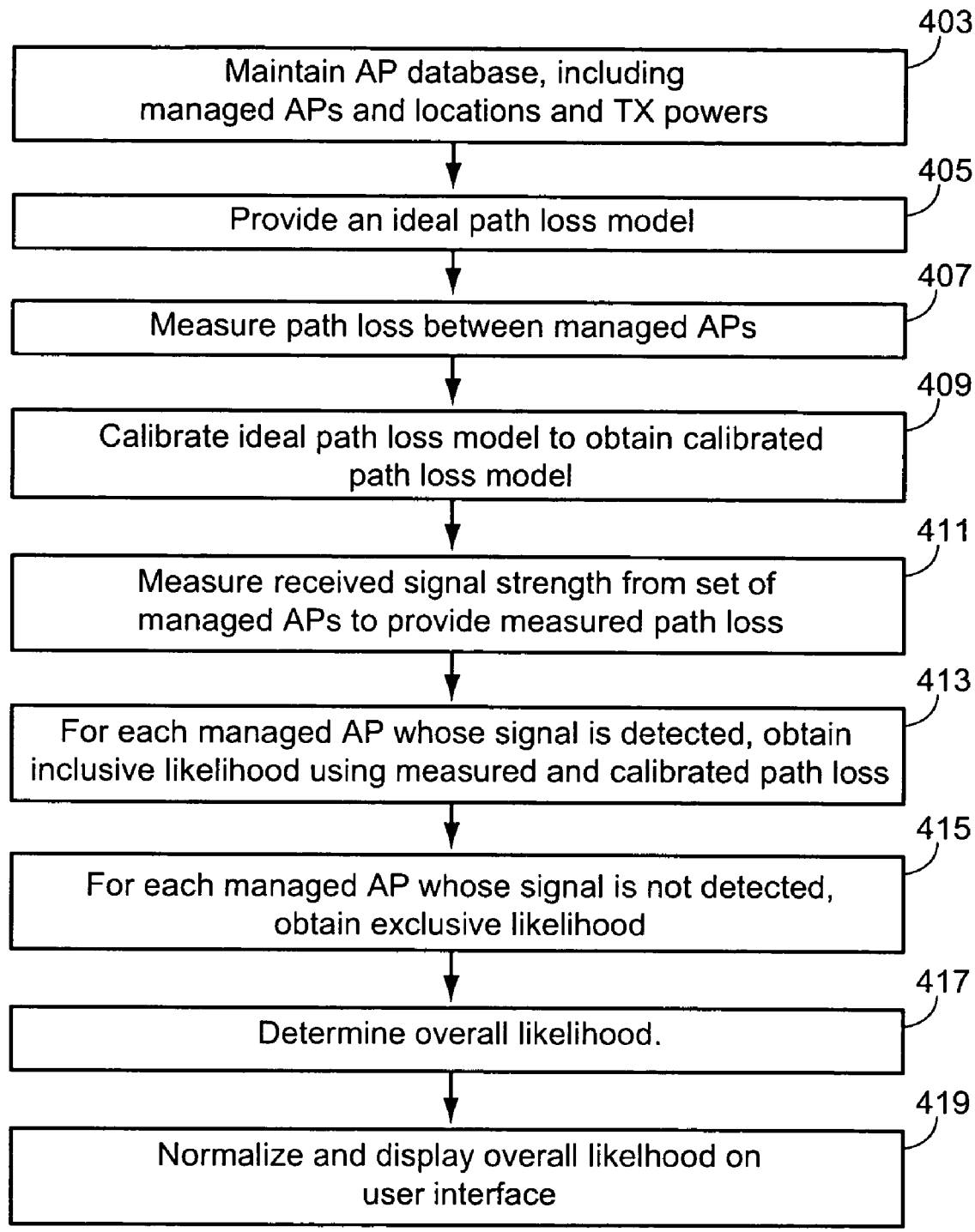
FIG. 4 shows a flowchart of one embodiment 400 of a method to determine the location of a client station that receives signals from managed APs whose location is known.

FIG. 4 shows a flowchart of one embodiment 400 of a method to determine the location of a client station that receives signals from managed APs whose location is known. Step 403 shows the step of maintaining an AP database of information on a set of managed APs, including the locations of the APs, e.g., in two-dimensions on a floor of a building, and parameters used by the APs, including the transmit powers of beacons and probe responses. For example, in the case of managed APs, the WLAN manager may include setting the transmit power of beacons and probe responses.

The method 400 includes a step 407 of providing a mechanism for determining the path loss as a function of distance assuming no obstacles. We call this an ideal path loss model. The ideal path loss model may be a formula or an algorithm or a lookup table, or some other mechanism for determining the path loss assuming no obstructions.

In one embodiment, the ideal path loss model determines the ideal path loss in a logarithmic scale such as dB as a linear function of the distance between the transmitting station and receiving station. In a particular embodiment, the following formula is used as the ideal path loss model to provide the path loss in dB, denoted $PL_{ideal}$, from a first transmitting station to a receiving station at a location a distance d meters away from the first transmitting station:

$$PL_{ideal}(d) = 37 + 35 \log d,$$

or if expressed as a path gain in dB denoted $G_{ideal}$, $$G_{ideal}(d) = -37 - 35 \log d.$$

Other embodiments may use slightly different values for the constants of the linear relationship.

Because there are obstructions such as walls, bathrooms, etc., in the building, the ideal path loss model typically underestimates the path loss. One aspect of the invention includes a step 407 of receiving measurements at the WLAN manager measuring the path loss between a set of managed APs in the area of interest that can hear each other. The step of measuring includes a transmitting managed AP, e.g., one of the managed APs' transmitting a beacon or probe response. Each of the other managed APs; is instructed by the AP manager to listen for the transmitted beacons or probe responses from the transmitting AP. Reports from these listening APs received at the WLAN manager include the received signal strength. The WLAN manager uses the received signal strength together with the known transmitting power to determine the measured path loss from the transmitting managed AP to each receiving managed AP.

The ideal path loss model provides the ideal path loss between any two managed APs that can hear each other. For each transmitting managed AP, the measurements at each receiving managed AP provide an adjustment factor to the ideal path loss predicted by the ideal path loss model.

Figure 5:
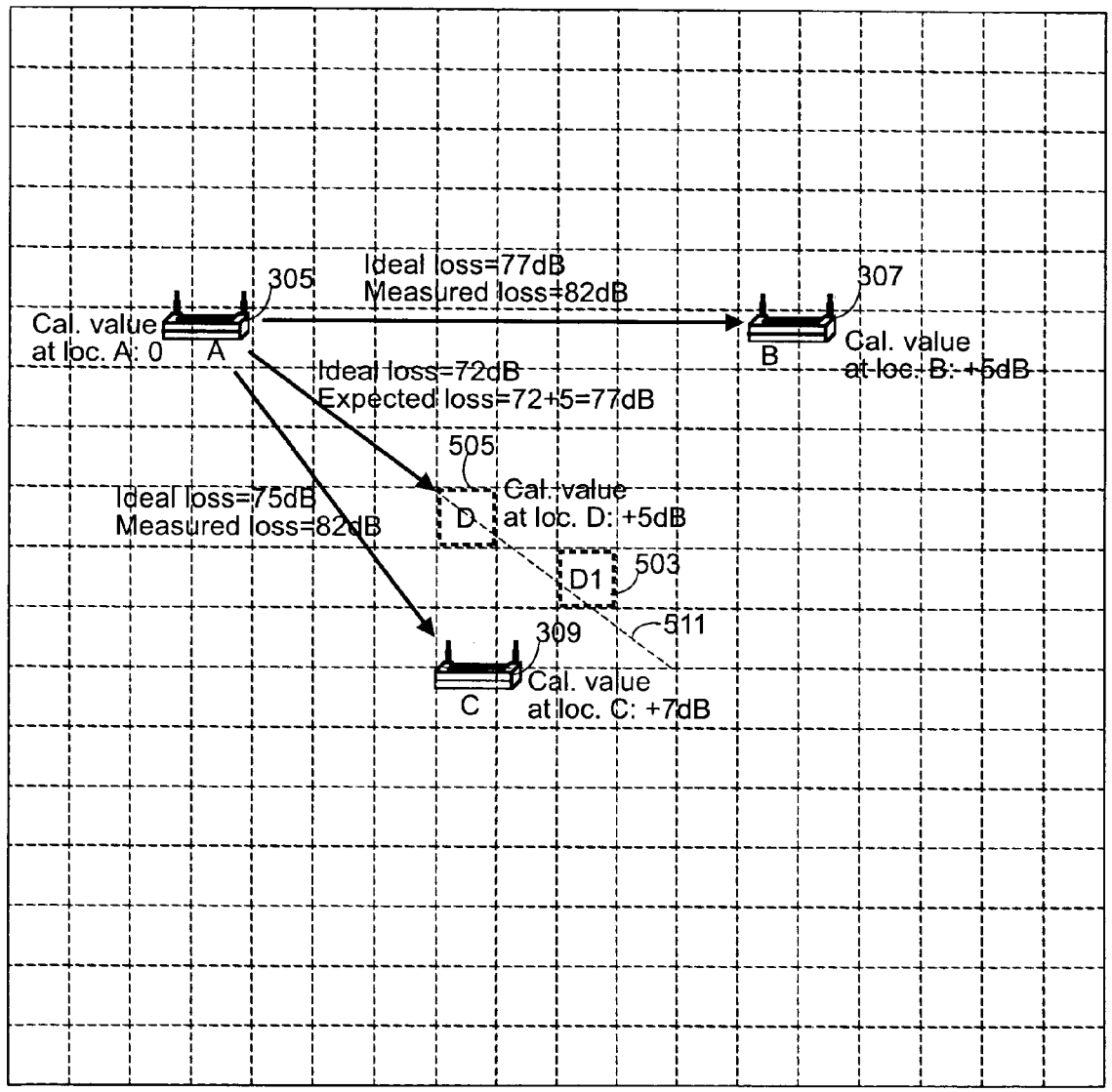
FIG. 5 shows an area of interest with three managed APs as an example illustrating the calibration aspect of the invention.

As an example, consider FIG. 5 that shows an area of interest and consider three managed APs, AP1 (305), AP2 (307), and AP3 (309) at locations A, B, and C, respectively. Note that FIG. 5 is not necessarily to scale, and the numbers used in the example are for illustrative purposes only. Consider the case of AP1 (305) transmitting. Suppose according the ideal path loss model, there should be, say 77 dB of path loss between AP1 and AP2. Suppose that because there are one or more obstructions between AP1 and AP2, when the method 400 measures the path loss from AP1 to AP2, e.g., by the WLAN manager knowing the power transmitted by AP1 and measuring the RSSI accurately, e.g., in dBm, at AP2 when receiving a signal from AP1, the method 400 measures a path loss of 82 dB from AP1 and AP2. The method 400 concludes that a station at location B (location of AP2 307) receiving a signal from location A suffers a path loss that needs to be adjusted by +5 dB—i.e., the gain adjusted by −5 dB—from what the ideal path loss model predicts.

Similarly, suppose the ideal path loss model predicts that there would be a path loss of 75 dB when transmitting at location A to the location C of AP3. Suppose further that the measured path loss is 82 dB. Thus, the method 400 concludes that a station at location C (location of AP3 3097) receiving a signal from location A suffers a path loss that needs to be adjusted by +7 dB—i.e., the gain adjusted by −7 dB—from what the ideal path loss model predicts.

The measurements may be repeated by AP2 207 transmitting, with the measured path loss compared to the path loss according to the ideal path loss model to obtain an adjustment factor at locations A and C for transmissions by AP2 307 at location B. The measurements may also be repeated by AP3 309 transmitting to obtain an adjustment factor at locations A and B for transmissions by AP3 309 at location C. Similarly, adjustment factors may be obtained for each of the managed APs in the area of interest transmitting.

Thus, step 407 includes, for each transmitting managed AP, compare the ideal path loss to the measured path loss for the known locations where there are stations, e.g., receiving managed APs to provide a sparse set of adjustment factors. Such adjustment factors may, e.g., account for structural differences in the area from what the mathematical model assumes, e.g., free air propagation, without requiring knowledge of the actual structure of the building. Measuring the path loss includes, for each managed access point, transmitting from the access point at a known transmit power, and obtaining measurements of the RSSI at the stations at known locations, e.g., the other managed access points to obtain the measured path loss from the transmitting access point to the other stations at known locations. The adjustment factor is the difference between the measured path loss and the path loss predicted by the ideal path loss model.

In a step 409, the method 400 determines the calibrated path loss factor at each of the area elements. In one embodiment, step 409 uses the sparse set of adjustment factors obtained by measurement received at the WLAN manager to determine the adjustment factor at each of the area elements. For each transmitting managed AP, for each area element, a second mathematical model may be used to predict the path loss from the transmitter to the area element. For example, an assumption that path loss varies as the inverse square of the distance may be assumed.

According to one embodiment of step 409, the adjustment factor between a known location and an unknown location is determined as a weighted sum of path losses between the known location and a sparse set of other known locations. For example, for a particular transmitting managed AP, for any unknown location denoted $L_x$, the path loss adjustment, denoted $A_x$, from the transmitter to the unknown location $L_x$ given the adjustment factors from the transmitter to a set of known locations $L_1, L_2, \ldots, L_N$, for a number denoted N of known locations where we have path loss measurements, is a weighted sum of the known/measured adjustment factors, where the weighting is monotonic with the inverse of the distance. In one embodiment, the weighting is proportional to the inverse square of the distance.

Let $A_i$ be the known adjustment factor, in dB of the path loss predicted by the mathematical model from transmitter to the i'th known receiver location $L_i$, i=1, ..., N,. In one embodiment, the adjustment factor $A_x$ apply at the unknown location $L_x$, denoted $A_x$, in dB, to what the mathematical model predicts is the weighted sum given by the following equation:

$$A_x = \frac{\sum_{i=1}^{N} A_i / d_i^2}{\sum_{i=1}^{N} 1 / d_i^2}.$$

The process is repeated for each managed AP that may transmit and from which path loss measurements are available or may be obtained. Thus, for each area element, step 409 provides the adjustment factor for receiving from each known transmitter location, e.g., from each managed AP. The ideal path loss model provides the "ideal" path loss to or from each known transmitter location to each location. Thus, step 409 equivalently provides, for each area element, the calibrated path loss, denoted $PL_C$ and equal to the ideal path loss adjusted by the adjustment factor from each known transmitter location (managed AP location) in the area of interest to each location, i.e., to each area element.

We call the set of adjustment factors, or equivalently, the set of calibrated path losses for each transmitting station at each location the calibrated path loss model. This model may be expressed as a gain, as an adjustment factor, as a path loss, or as a method, e.g., formula or algorithm, for determining any of these quantities. The calibrated path loss model may be expressed as a vector, called the calibrated path loss vector. Each component of the calibrated path loss vector is the calibrated path loss from a particular known transmitting location, e.g., from a managed AP. There is such a calibrated path loss vector for each area element.

In a step 411, a wireless station at an unknown location receives signals from the managed APs in the area of interest. In one embodiment, the signals received from the managed APs are beacons or probe responses. The transmission from some of the APs may be received and some from others not be detected by the receiving station. One embodiment includes the receiving station providing the received signal strength and other received signal information, e.g., the identity of the transmitting AP, to the WLAN manager wherein, according to one embodiment, the method 400 is implemented, and the WLAN manager receiving this information. Because each managed AP is known to the WLAN manager and transmits e.g., transmits beacons and probe responses at a known transmit power, step 411 includes determining the measured path loss from each transmitting AP whose transmissions are received to the receiving station. Thus, step 411 provides what we call a measured path loss vector, with each vector component being the measured path loss for the same transmitter as the corresponding component of the calibrated path loss vector. There are thus some empty components in the measured path loss vector corresponding to transmitters whose transmissions are undetected at the receiving station.

The remaining steps of the method 400 use the measured path obtained using measurements received from the receveing station between the receiving station and each transmitting station and compare the measured path loss with the calibrated path loss, e.g., with the components of the calibrated path loss vector to determine the likely location of the receiving station.

Consider again FIG. 5 and consider AP1 305 transmitting, and the transmissions received by a receiving station at an unknown location. Suppose the path loss from location A of AP1 to the receiving station is measured at 77 dB. According to the ideal path loss model, the likely distance is $d_x$. However, depending on the direction, this distance is known to be too large because there are obstructions that cause the path loss to be more than predicted by the model. For example, along the line 511 on FIG. 5, suppose a station at an unknown location receives a signal from AP1 that shows a path loss 75 dB. The model predicts the location, assumed here to be along line 511, to be D1 (513). However, because the calibrated path loss model predicts that at location D (505), the adjustment factor is 5 dB and the ideal path loss predicted by the ideal path loss model is 70 dB, i.e., the calibrated path loss vector component for transmitter AP1 is 75 dB, the method 400 would infer that the previously unknown location of the station is near D rather than near D1 to the closest area element, e.g., 10 ft by 10 ft square region.

Another aspect of the invention is the use of likelihood functions around locations that the calibrated path loss model predicts. Consider a receiver at some unknown location. Step 411 provides the calibrated path loss for each AP. Consider first the components of the measured and calibrated path loss vector for transmitter at known locations whose transmissions are detected by the receiving station. For each location, i.e., for each area element, or equivalently, for each calibrated path loss, a likelihood function we call the inclusive likelihood function provides the likelihood at any location, e.g., at an area element, that the transmission from a nearby transmitter, e.g., a nearby managed AP could have been received at the location with the measured path loss, i.e., would have a particular calibrated and measured path loss from the transmitter. For any AP whose transmissions are received, the inclusive likelihood function may be expressed as a function of the difference between the calibrated path loss for each location and the measured path loss. It is maximum where the measured path loss is equal to the calibrated path loss. Thus, in a step 413, using the inclusive likelihood function, the locations predicted by the calibrated path loss model are made fuzzy. For each transmitting AP detected, the location predicted by the calibrated path loss model is the most likely location and nearby locations are less likely the further the location is from the most likely location predicted by the calibrated path loss model.

Figure 6A:
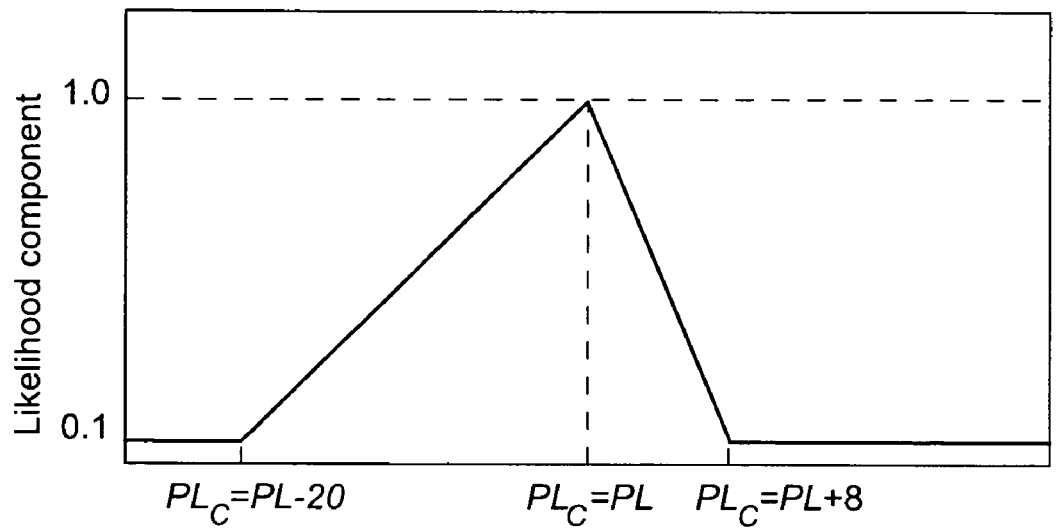
FIG. 6A shows the inclusive likelihood function used in one embodiment of the invention.

FIG. 6A shows the inclusive likelihood function used in one embodiment of the invention. Note this likelihood function is asymmetric round the peak likelihood. Other likelihood functions also may be used in different embodiments, e.g., symmetric likelihood functions, likelihood functions that are Gaussian shaped (symmetric or asymmetric), raised cosine curve shaped (symmetric or asymmetric), and so forth.

There therefore is a likelihood at each location as a result of transmitting by each managed AP that the station detects. Step 413 includes determining the overall inclusive likelihood as a result of a station receiving transmissions from managed APs as the product of all the inclusive likelihood components due to the individual detected AP transmissions.

Step 417 determines the overall likelihood of a measured path loss vector occurring in a particular area element as the product of all likelihood components.

Step 419 includes normalizing the product of the likelihood components to a common maximum and displaying the overall likelihood to the user of the WLAN manager on a user interface. One embodiment shows the normalized likelihood as a colored contour overlay.

Figure 7:
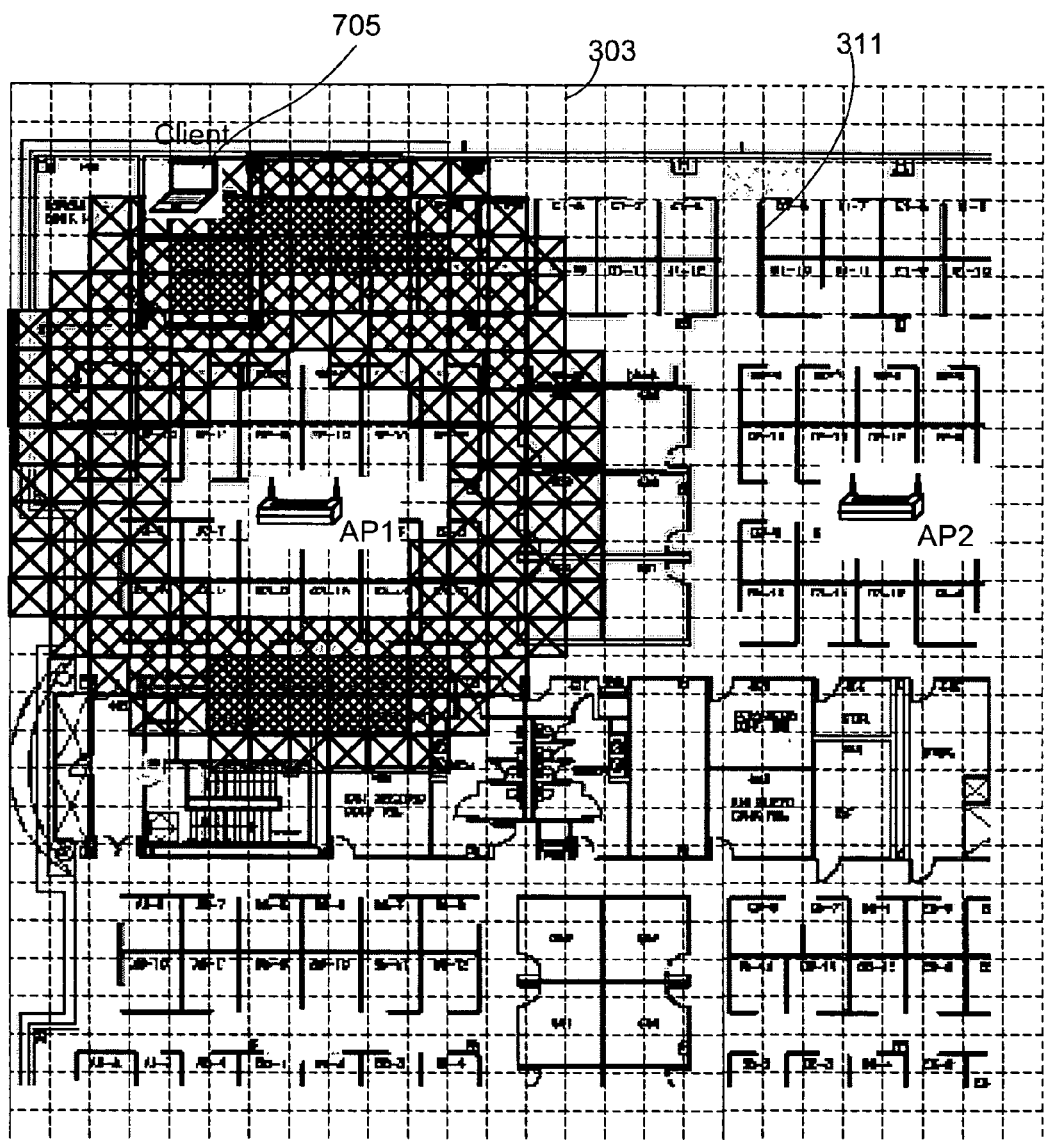
FIG. 7 shows the user interface of FIG. 3B that includes location contours obtained using only inclusive likelihood function components according to one aspect of the invention.

Consider, for example, FIG. 7 that shows the user interface of FIG. 3B that includes a graphic overlay 311 of the architectural structure of the area of interest, a graphic overlay 303 of rectangular grid of the area of interest, and a graphic overlay of showing the location of the managed APs. FIG. 7 shows a user interface display that includes the location contour (shown as area elements shaded differently) derived using the inclusive likelihood components. In this example, a client station at location 705 (upper wall toward the left) detected AP1 and AP2. Note that the physical location algorithm has no way to decide whether the client lies within the upper or lower colored area elements.

Because there may be managed APs that the WLAN manager knows are transmitting, but that are not received at the receiving station, one embodiment includes step 415 of using an exclusive likelihood function for each nearby AP that is not detected at the receiving station. Each receiving station has receive sensitivity, e.g., as specified by the variant of the IEEE 802.11 standard the receiver conforms to. Thus, in one embodiment, in the case of the failure to detect a known transmission at a known signal power, the station that fails to detect is assumed to receive at a particular signal strength, e.g., the specified receive sensitivity of the receiver of the station. In one embodiment, the receiver sensitivity is 87 dBm, i.e., the receiver should be able to detect at −87 dBm, i.e., with a path loss of 87 dB if the transmitter was transmitting at 1 mW. We assume that the received signal strength at the receiver sensitivity for a receiver not detecting a transmission. We denote the resulting measured path loss $PL_S$. For any AP not detected, the exclusive likelihood decreases as calibrated path loss becomes less than the assumed measured path loss $PL_S$, e.g., as the location becomes closer to an AP that was not detected. In one embodiment, the exclusive likelihood that the calibrated path loss is larger than the assumed measured path loss $PL_S$ is 1. Because calibrated path loss for any transmitting AP is a function of location, the exclusive likelihood component computes the likelihood that a nearby transmitter, e.g., a nearly transmitting managed AP could go undetected at the area element.

Figure 6B:
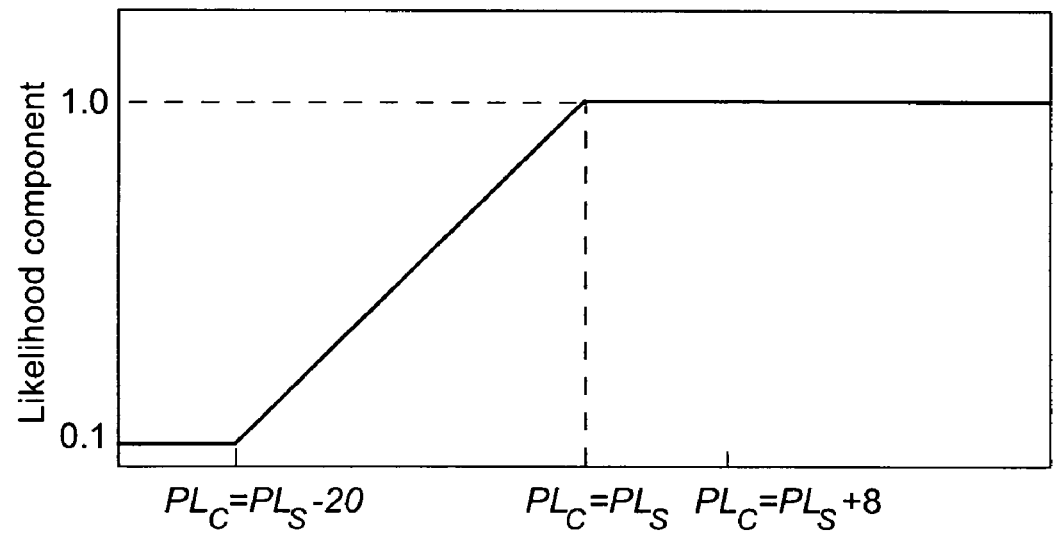
FIG. 6B shows one embodiment of an exclusive likelihood function according to an aspect of the invention.

FIG. 6B shows one embodiment of an exclusive likelihood function. In other embodiments, the decrease in the likelihood need not be linear with the amount in dB with which the calibrated path loss is lower than the assumed measured path loss $PL_S$. For example, in other embodiments, a half-Gaussian or a half raised cosine curve may be used.

When both inclusive and exclusive likelihood functions are used, step 417 determines the overall likelihood of a measured path loss vector occurring in a particular area element as the product of all inclusive and exclusive likelihood components.

Figure 8:
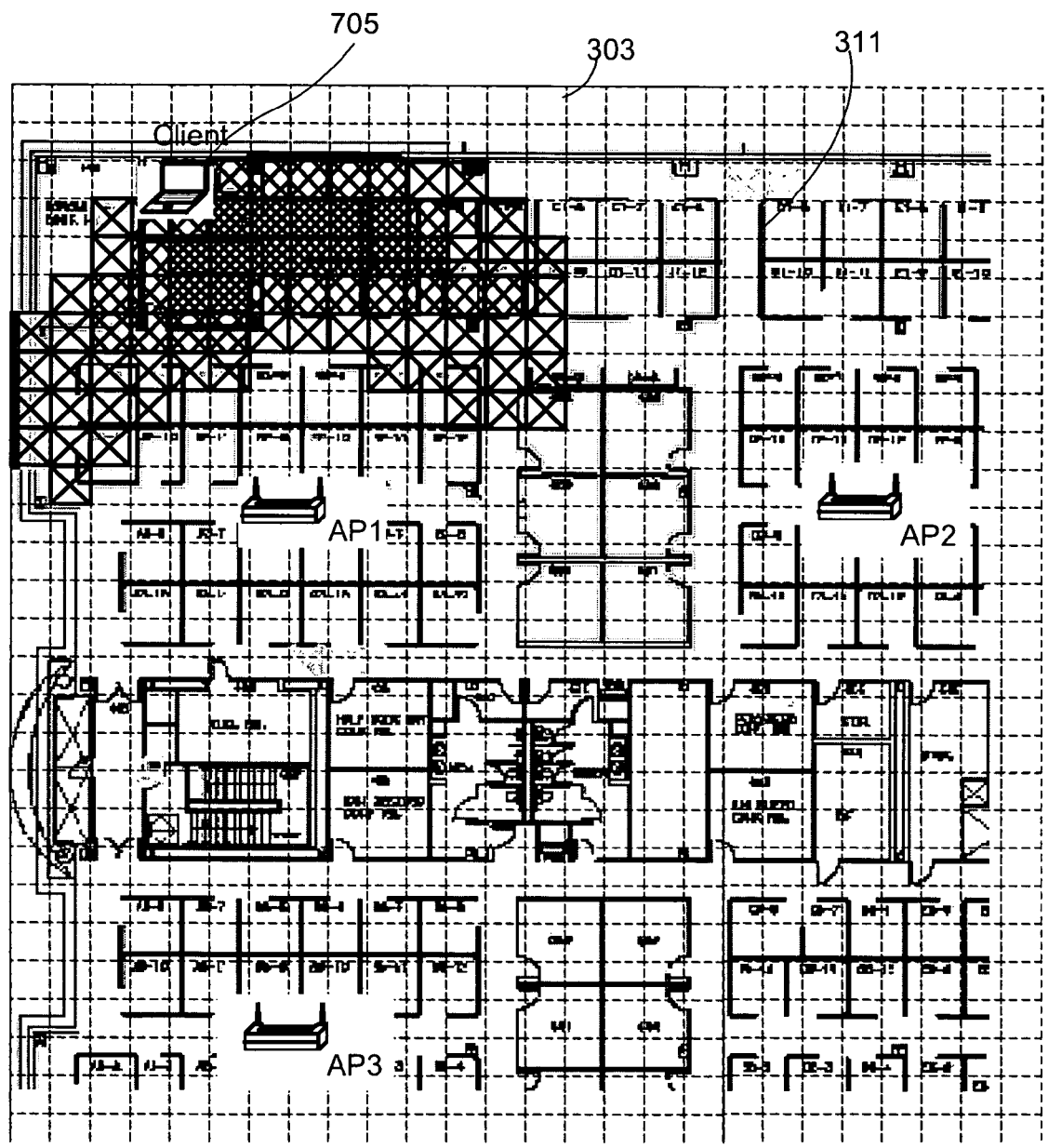
FIG. 8 shows the user interface of FIG. 3B that includes location contours obtained using only both inclusive and exclusive likelihood function components according to one aspect of the invention.

FIG. 8 shows the location contour derived using both inclusive and exclusive components and displayed (step 419) on the user interface of FIG. 3B. Again, the client station at Location 705 detected AP1 and AP2. The difference in this example, however, from that of FIG. 7 is that the likelihood function uses the fact that the client station did not detect AP3. The exclusive likelihood component from AP3 reduces the overall likelihood that the client lies between AP1 and AP3, leaving the much higher likelihood that it lies within the upper area element of FIG. 8.

Locating Rogue APs

Another aspect of the invention is a method of locating potential rogue APs. Potential rogue APs may be detected by managed APs and by managed client stations. See above-mentioned concurrently filed U.S. Provisional Patent Application Ser. No. 60/490,847 titled "A METHOD, APPARATUS, AND SOFTWARE PRODUCT FOR DETECTING ROGUE ACCESS POINTS IN A WIRELESS NETWORK," incorporated herein by reference and called the "Rogue Detection Invention" herein, for how passive and/or active scanning leads to the WLAN manager identifying potential rogue APs using beacons and/or probe responses detected by the passive or active scanning and reported back to the WLAN manager.

According to one variant of the Rogue Detection Invention, the WLAN manager receives reports from a managed AP of any transmissions of beacons or probe responses received at the AP that were transmitted by a potential rogue AP. According to another variant of the Rogue Detection Invention, the WLAN manager receives reports from a managed AP of any transmissions of beacons or probe responses received at one or more clients of the managed AP that were transmitted by a potential rogue AP. The WLAN manager uses the reports to determine, e.g., by looking up the WLAN database, to determine if the potential rogue station is likely to be a rogue. The approximate location of the rogue, e.g., to within an area of interest such as a floor of a building, is determined from knowledge of the location of the managed APs receiving the beacons or probe responses, or from the inferred knowledge of the location of the managed clients receiving the beacons or probe responses.

Part of the information received at the WLAN manager is the RSSI at the station receiving the beacon or probe response from the potential rogue AP. These received signal strengths are used, according to an aspect of the present invention, to further locate the potential rogue AP.

In the method 400 described above and in FIG. 4 for detecting the location of a receiving clients, the signals received and reported to the WLAN manager are from transmitters whose transmitting power and location are known. Rogue APs transmit at a power level that is unknown.

One embodiment of the method for determining the location of a potential rogue AP determines the likely locations, e.g., the likelihoods as a function of location by displaying likelihood contours for a set of transmit powers. The set of transmit powers include the likely transmit powers.

Figure 9:
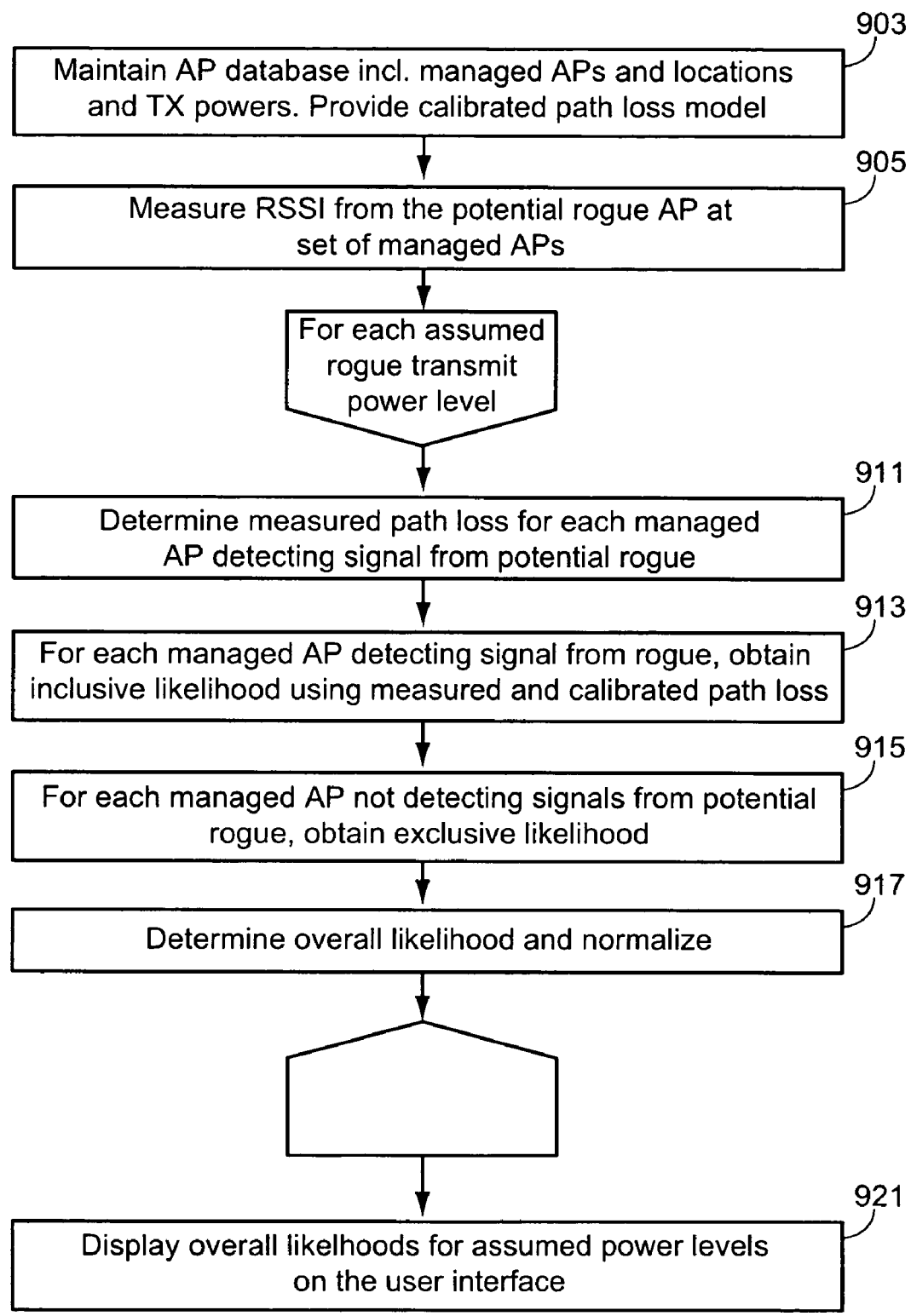
FIG. 9 shows one embodiment of a method of locating a potential rogue access point using signals—beacons or probe responses—received at one or more managed access points whose location is known.

FIG. 9 shows one embodiment 900 of the method of locating a potential rogue access point using signals—beacons or probe responses—received at one or more managed access points whose location is known. Step 903 includes locating the area of interest for the rogue and includes steps 403, 405, 407, and 409 of maintaining an AP database of managed APs and their locations and transmit powers, providing an ideal path loss model, receiving measurements to determine the path loss between the managed APs in order to calibrate the ideal path loss model to obtain a calibrated path loss model of the area of interest for each potential managed AP that might receive a transmission from the potential rogue AP. While in method 400, the calibrated path loss model was used for transmitting from APs to a receiver at an unknown location, in method 900, the calibrated path loss model is used for determining the location of a transmitting station—the potential rogue AP—whose signals are received (or not) at the managed APs at the known locations. Thus a calibrated path loss vector is obtained, with each component of the vector corresponding to a managed AP.

Steps 911 through 917 of method 900 locate the potential rogue for an assumed transmit power level. In one embodiment, steps 911 through 917 are repeated for each transmit power level of the set of transmit powers assumed for the potential rogue AP.

In a step 911, for each managed AP that detects the transmissions, e.g., beacons/probe responses from the potential rogue AP, measurements are reported to the WLAN manager and the WLAN manager determines the measured path loss based on the assumed transmit power for the rogue and the RSSI at the receiving managed AP. Thus a measured path loss vector is determined, with each component corresponding to one of the managed APs at which a beacon or probe response was received from the potential rogue.

In a step 915, for each managed AP that detects the transmissions, e.g., beacons/probe responses from the potential rogue AP, and at each location, e.g., each area element, the inclusive likelihood component corresponding to that managed AP is determined using the measured and calibrated path losses.

In a step 917, in one embodiment, for each managed AP in the area of interest that fails to detect transmissions, e.g., beacons/probe responses from the potential rogue AP, and at each location, e.g., each area element, the exclusive likelihood component corresponding to that managed AP is determined using the assumed measured path loss vector (assuming receiver fails to receive at the limit of the receiver sensitivity) and calibrated path losses.

In a step 917, the inclusive and exclusive likelihood components are multiplied and the overall likelihood normalized.

Thus, the repetitions of steps 911 through steps 917 provide a set of overall likelihoods for each assumed transmit power level for the potential rogue.

In a step 921, the results of the rogue location are displayed to the user on a user interface. Different embodiments display the results in different ways. In one embodiment, the WLAN manager displays the location contours for each assumed transmit power level individually, either one per single display screen, or as a set of displays on a single screen. In another embodiment, the location contours for the assumed transmit power levels are displayed collectively. The collective contour is equivalent to the union of multiple location contours across a range of power levels, saving the highest likelihood value in each predefined area element.

Figure 10C:
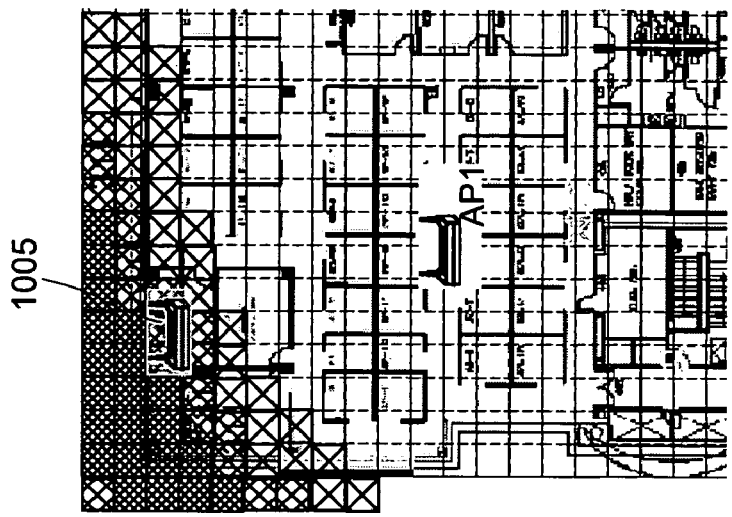
FIGS. 10A, 10B, and 10C show three displays of the results of the method shown in FIG. 9 for a rogue AP transmitting at a transmit power of 5 mW for a set of three assumed rogue transmit powers: 2 mW, 5 mW, and 20 mW, respectively.
Figure 10B:
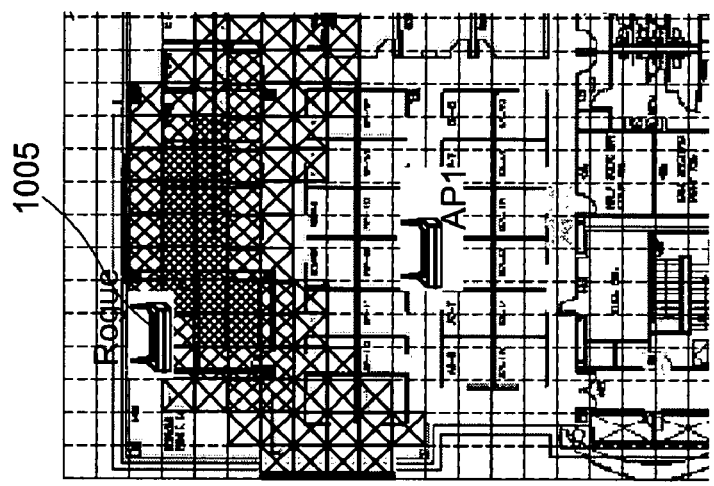
Figure 10A:
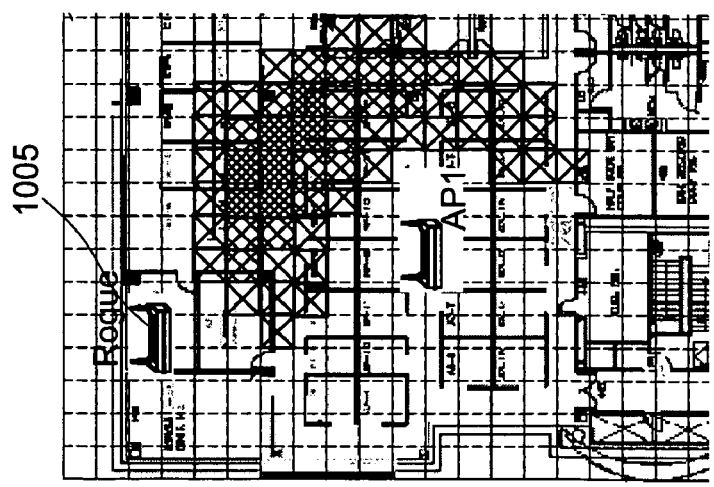

FIGS. 10A, 10B, and 10C show three displays of the results of method 900 for a rogue AP 1005 transmitting at a transmit power of 5 mW for a set of three assumed rogue transmit powers: 2 mW, 5 mW, and 20 mW, respectively. The transmitting AP is detected by AP1 and AP2, but not AP3. The three figures show three respective individual location contours generated under the assumptions that the rogue transmits at each respective power of the three assumed transmit powers. Without knowing the transmit power, the collective contour (not shown) would appear no larger than the overlay of the individual contours for each power level, and possibly much smaller. The reason is that the process of normalizing one individual contour may boost a moderately likely "best" area element into the most likely zone of its display, while the same process may not need to boost an already highly likely "best" area element of another individual contour to the display's most likely (shown here as the darkest) zone. Since the collective case is normalized after the union of individual contours, the moderately likely "best" area element of the moderately likely contour would be overshadowed by the highly likely "best" contour. The collective most likely zone would resemble the darkest most likely zone of the highly likely "best" contour and show little or no emphasis in moderately likely "best" contour.

The method 900 describes one embodiment of determining rogue location contours on signals detected by managed APs.

Figure 11:
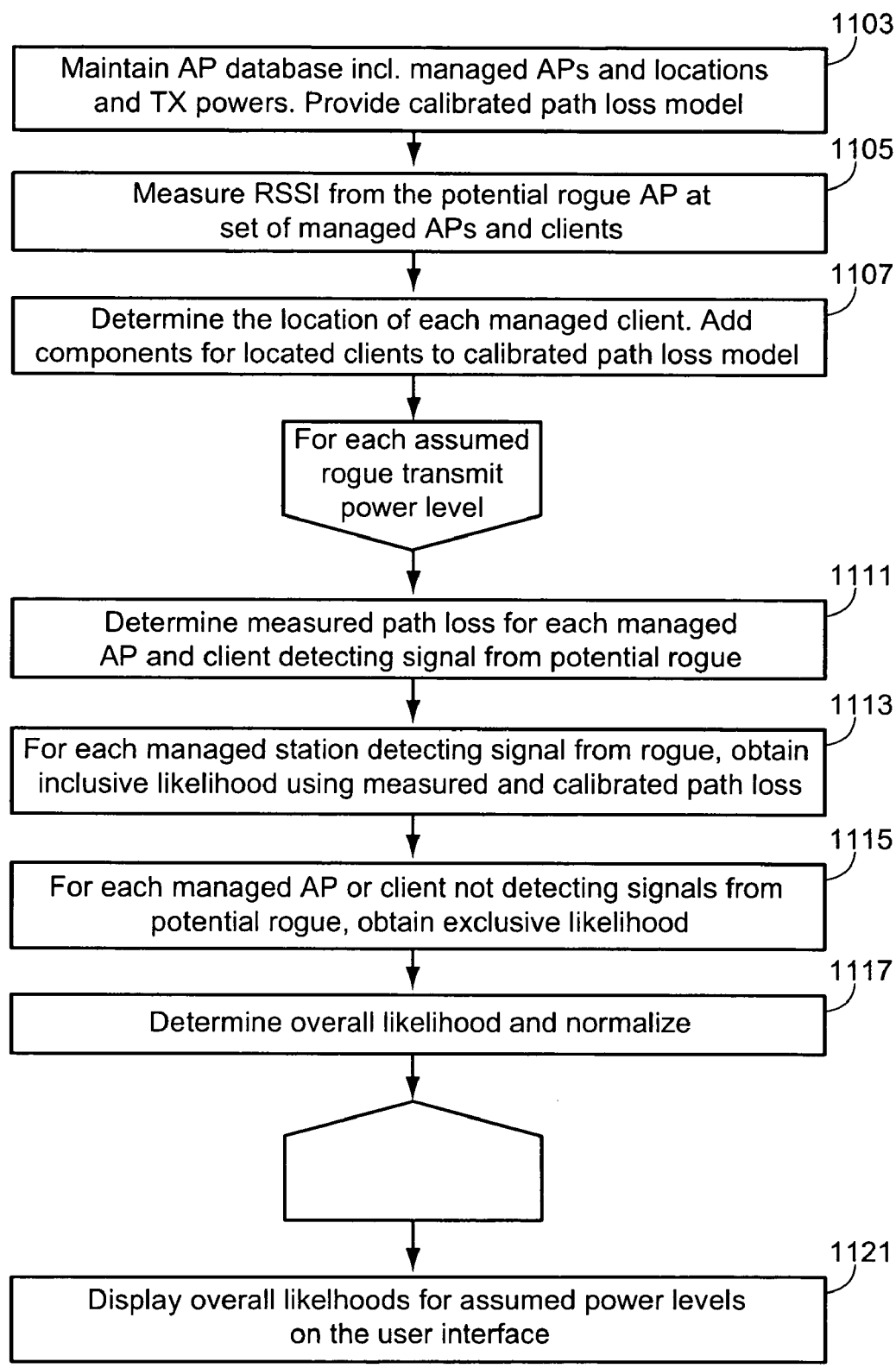
FIG. 11 shows one embodiment of a method of locating a potential rogue access point using signals—beacons or probe responses—received at one or more managed access points whose location is known and at one or more managed client stations whose location is determined according to the method shown in FIG. 4.

Rogue APs may not always be detected by managed APs. Thus one embodiment also uses signals from potential rogue APs, e.g., beacons and probe responses detected at managed clients of one or more managed APs. FIG. 11 shows a flow chart of a method 100 that uses client detection from potential rogue stations. Step 1103 is, as described above, maintaining the AP database and the calibrated path loss model for each managed AP. In a step 1105, the RSSI from the potential rogue AP is measured at a set of detecting managed APs and additionally one or more client stations of managed APs and reported to the WLAN manager. The WLAN manager receives the measurements. In a step 1107, the method 1100 predicts the location of one or more managed clients using the method 400 (FIG. 4) described herein. In one embodiment, this client location step is carried out at least for each managed client station that detects the rogue AP's beacon or probe response. In another embodiment, all the managed clients that are associated with managed APs in the area of interest are located. The most likely client location (overall likelihood) is assumed to be the client location using both inclusive and exclusive likelihood components. Step 1107 also includes adding components to the calibrated path loss model for the clients located in step 1107, e.g., the clients detecting signals from the potential rogue AP.

The method now proceeds in the same manner as method 900, but now using both APs whose location is known and clients whose location is determined by step 1107. Thus, steps 1111, 1113, 1115, and 1117 are repeated for each of a set of assumed transmit powers for a potential rogue A. For each power level: step 1111 reports measurements to the WLAN manager that receives the reports and determines the measured path loss for each managed AP and managed client detecting a signal (beacon or probe response) from the potential rogue AP; step 1113 obtains the inclusive likelihood component using the measured and calibrated path loss component corresponding to each managed AP and managed client detecting a signal (beacon or probe response) from the potential rogue AP; step 1115 obtains the exclusive likelihood component using the assumed measured path loss component (assuming the receiver just fails to receive at the limit of receiver sensitivity) and the calibrated path loss component corresponding to each managed AP and managed client not detecting a signal from the potential rogue AP; and step 1117 determines overall likelihood and normalizes this overall likelihood measure. Step 1121 displays the results to the user/operator of the WLAN manager.

Note that while the determining of the calibrated path loss model described above uses measurements between each of a set of managed access points of a managed wireless network, the method in general includes receiving at the WLAN manager measurements measuring the received signal strengths at each respective wireless station of a first set of wireless stations of a wireless network for signals received as a result of transmissions by each wireless station of a second set of wireless stations of the wireless network. The locations of each station of the first and second set are known. The method includes calibrating the ideal path loss model using the received measurements obtained by the measuring step to determine a calibrated path loss model for transmission by each of the second set of wireless stations. The first and second sets, however, need not be identical. Each transmission by a respective station of the second set is at a known respective transmit power. In the embodiment described herein, the first and second sets are identical, and are the set of managed access points in the area of interest.

Note that in the above description, the calibrated path loss model provides the path loss for a set of locations for transmission by each of the second set of wireless stations, or for reception at each of the second set of wireless stations for transmissions from each location. Those in the art will understand that the calibrated path loss may be expressed as a path loss, gain, as an adjustment factor, as a formula for determining the path loss, gain, or adjustment factor, or as an algorithm, a set of processing instructions, or a method of determining the path loss, gain, or adjustment factor. The term calibrated path loss model is meant to include all these variations.

One embodiment of each of the methods described herein is in the form of a computer program that executes on a processing system, e.g., one or more processors that are part of the WLAN manager 103. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should be appreciated that although the invention has been described in the context of the IEEE 802.11 standard, the invention is not limited to such contexts and may be utilized in various wireless network applications and systems, for example in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in wireless networks conforming to other standards and for other applications, including other WLAN standards, bluetooth, GSM, PHS, CDMA, and other cellular wireless telephony standards.

While embodiments described above use an assumed measured path loss component assuming the received signal strength is at the limit of the receiver sensitivity for the receiver just failing to detect the transmission, alternate embodiments use different assumed measured path loss components, e.g., a signal strength higher by a selected amount than the receiver sensitivity.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
   accepting a radio loss model applicable to an area of interest;
   accepting data indicative of path losses between pairs of wireless stations of a first set of wireless stations;
   calibrating the path loss model using the accepted data to obtain a calibrated path loss model;
   causing respective transmissions at known respective transmit powers from at least some of the stations of the set of wireless stations;
   receiving measurements from a particular wireless station of unknown location, the measurements indicative of the received signal strengths at the particular wireless station resulting from the caused respective transmissions; and
   determining the likely location or locations of the particular wireless station using the received measurements and the calibrated path loss model.

2. A method as recited in claim 1, wherein the first set of wireless stations is a set of managed access points of a managed wireless network, the managed access points being at known locations, the method further comprising:
   measuring the path loss between pairs of managed access points of the set of managed access points.

3. A method as recited in claim 2, wherein the wireless network substantially conforms to the IEEE 802.11 standard.

4. A method as recited in claim 2, wherein the determining of the likely location or locations includes
   determining a set of likelihood components for each of a set of locations, each component corresponding to a respective managed access point whose transmissions are listened for at the particular station, and
   determining an overall likelihood for each of the set of locations as the product of the likelihood components.

5. A method as recited in claim 4, wherein the determining of the likely location or locations includes, for each managed access point whose transmitted signal is detected at the particular station, determining an inclusive likelihood component as a function of location using the measured path loss and calibrated path loss for the transmission from the respective managed access point to the particular wireless station, such that each inclusive likelihood component provides an indication of the likelihood at any location that the transmission from the access point whose transmission is detected could have been received at the location with the measured path loss.

6. A method as recited in claim 5, wherein the determining of the likely location or locations includes, for each managed access point whose transmitted signal is not detected at the particular station, determining an exclusive likelihood component as a function of location, such that each exclusive likelihood component provides an indication of the likelihood at any location that the transmission from the access point whose transmission is not detected could have been received at the location with an assumed signal strength for the transmitted power.

7. A method as recited in claim 1, wherein the calibrating includes comparing the path loss to the measured path loss for the known locations of the transmitting and receiving wireless stations to provide a sparse set of adjustment factors between a sparse set of known locations.

8. A method as recited in claim 7, wherein the adjustment factor between a known location and an unknown location is determined as a weighted sum of path losses between the known location and a sparse set of other known locations.

9. A tangible computer-readable storage medium configured with instructions that when executed by one or more processors cause at least one of the processors to implement a method comprising:
  accepting a radio path loss model applicable to an area of interest;
  calibrating the path loss model using measurements received from each respective wireless station of a first set of wireless stations of a wireless network measuring the received signal strengths at each of the respective wireless stations, the stations receiving signals as a result of transmissions by respective wireless stations of a second set of wireless stations of the wireless network, each respective transmission at a known respective transmit power, the locations of each station of the first and second set being known or determined, the calibrating being to determine a calibrated path loss model between the receiving and transmitting wireless stations;
  receiving measurements from each respective station of a third set of wireless stations of the wireless network measuring the received signal strength at each of the respective stations resulting from transmission of a signal from a potential rogue access point, each station of the third set being at a known or determined location; and
  for each of a set of assumed transmit powers for the potential rogue access point, determining the likely location or locations of the potential rogue access point using the received signal strengths at the stations of the third set and the calibrated path loss model.

10. A tangible computer-readable storage medium as recited in claim 9, wherein the first set and the second set of stations include the same set of managed access points of a managed wireless network such that the calibration of the path loss model includes the receiving of measurements measuring the path loss between each of the set of managed access points and such that the calibrated path loss model provides a calibrated path loss at each location of the area of interest between each transmitting managed AP and each receiving managed AP.

11. A tangible computer-readable storage medium as recited in claim 10, wherein the third set of wireless stations includes managed access points of the set of access points of the wireless network.

12. A tangible computer-readable storage medium as recited in claim 10, wherein the third set of wireless stations includes wireless clients of at least one managed access point of the wireless network, the method further including determining the location of each client by a radiolocation method including:
  receiving measurements measuring the received signal strengths at the wireless client resulting from respective transmissions from at least some of the managed access points, said each of the respective transmissions being at a known corresponding transmit power; and
  determining the likely location of the wireless client using the received signal strengths and the calibrated path loss model.

13. A tangible computer-readable storage medium as recited in claim 10, wherein the wireless network substantially conforms to the IEEE 802.11 standard.

14. A tangible computer-readable storage medium as recited in claim 10, wherein the determining of the likely location or locations includes:
  determining a set of likelihood components for each of a set of locations, each component corresponding to a respective managed access point whose transmissions are listened for at the particular station, and
  determining an overall likelihood for each of the set of locations as the product of the likelihood components.

15. A tangible computer-readable storage medium as recited in claim 14, wherein the determining of the likely location or locations includes, for each managed access point whose transmitted signal is detected at the particular station, determining an inclusive likelihood component as a function of location using the measured path loss and calibrated path loss for the transmission from the respective managed access point to the particular wireless station, such that each inclusive likelihood component provides an indication of the likelihood at any location that the transmission from the access point whose transmission is detected could have been received at the location with the measured path loss.

16. A tangible computer-readable storage medium as recited in claim 15, wherein the determining of the likely location or locations includes, for each managed access point whose transmitted signal is not detected at the particular station, determining an exclusive likelihood component as a function of location, such that each exclusive likelihood component provides an indication of the likelihood at any location that the transmission from the access point whose transmission is not detected could have been received at the location with an assumed signal strength for the assumed transmitted power.

17. A tangible computer-readable storage medium as recited in claim 14, wherein the method further comprises:
  displaying the overall likelihood to the user on a user interface showing the area of interest.

18. A tangible computer-readable storage medium as recited in claim 9, wherein the calibrating includes comparing the path loss to the measured path loss for the known locations of the transmitting and receiving stations to provide a sparse set of adjustment factors between a sparse set of known locations.

19. A tangible computer-readable storage medium as recited in claim 18, wherein the adjustment factor between a known location and an unknown location is determined as a weighted sum of path losses between the known location and a sparse set of other known locations.

20. A tangible computer-readable storage medium configured with one or more code segments to instruct one or more processors of a processing system to execute a method comprising:
  accepting a radio path loss model applicable to an area of interest;
  accepting data indicative of path losses between pairs of wireless stations of a first set of wireless stations, the data provided by measuring the path loss between pairs of the first set of wireless stations, the wireless stations being at known or determined locations in the area of interest;

calibrating the accepted path loss model using the accepted data to determine a calibrated path loss model between the receiving and transmitting wireless stations;

causing respective transmissions at known respective transmit powers from at least some of the stations of the first set of wireless stations;

receiving measurements from a particular wireless station of unknown location, the measurements indicative of the received signal strengths at the particular wireless station resulting from the caused respective transmissions; and determining the likely location or locations of the particular wireless station using the received measurements and the calibrated path loss model.

21. An apparatus comprising:

a processing system including a memory and a network interface to couple the apparatus to a network including a set of wireless stations of a wireless network at known or determined locations, the processing system to:

accept a radio path loss model applicable to an area of interest;

instruct each of the wireless stations at known or determined locations in the area of interest to measure and report the received signal strengths as a result of transmissions by respective other wireless stations of the set, each respective transmission at a known respective transmit power;

receive the reports of the measurements from the instructed wireless stations;

calibrate the path loss model to determine a calibrated path loss model between the receiving and transmitting wireless stations;

receive from a particular wireless station of unknown location the received signal strengths resulting from respective transmissions from at least some of the wireless stations in the area of interest, said each of the respective transmissions being at a known corresponding transmit power; and determine the likely location or locations of the particular wireless station using the received signal strengths at the particular wireless station and the calibrated path loss model.

22. A method comprising:

accepting a radio path loss model;

calibrating the path loss model in an area of interest using path loss determined from measurements between wireless stations of a wireless network, the wireless stations at known locations, the measurements received from some of the wireless stations measuring their received signal strengths resulting from respective transmissions from respective wireless stations, each respective transmission at a known respective transmit power, the calibrating being to determine a calibrated path loss model between the wireless stations;

determining the measured path loss between a particular wireless station of unknown location and at least some of the wireless stations by receiving measurements from the particular wireless station, wherein in the case the wireless station of unknown location is known not to be a rogue access point, the determining uses measurements received from the particular wireless station of unknown location measuring the received signal strength as a result of respective transmissions from at least some of the wireless stations, said each of the respective transmissions being at a known respective transmit power, and wherein, in the case the wireless station of unknown location is a potential rogue access point, the determining uses measurements received from each of at least some of the wireless stations measuring the received signal strength at each of the wireless stations resulting from transmission of a signal from the potential rogue access point for each of a set of assumed transmit powers for the potential rogue access point; and determining the likely location or locations of the particular wireless station of unknown location using the measured path loss and the calibrated path loss model.

23. An apparatus comprising:

means for accepting a path loss model applicable to an area of interest;

means for accepting data indicative of path losses between pairs of wireless stations of a first set of wireless stations;

means for calibrating the path loss model using the accepted data to obtain a calibrated path loss model;

means for causing respective transmissions at known respective transmit powers from at least some of the stations of the set of wireless stations;

means for receiving measurements from a particular wireless station of unknown location, the measurements indicative of the received signal strengths at the particular wireless station resulting from the caused respective transmissions; and means for determining the likely location or locations of the particular wireless station using the received measurements and the calibrated path loss model.

24. An apparatus as recited in claim 23, wherein the first set of wireless stations is a set of managed access points of a managed wireless network, the managed access points being at known locations, the apparatus further comprising:

means for measuring the path loss between pairs of managed access points of the set of managed access points.

25. An apparatus as recited in claim 24, wherein the wireless network substantially conforms to the IEEE 802.11 standard.

* * * * *

UNITED STATES PATENT AND TRADEMARK OFFICE
CERTIFICATE OF CORRECTION

PATENT NO.         : 8,077,079 B2                             Page 1 of 1
APPLICATION NO.    : 11/268030
DATED              : December 13, 2011
INVENTOR(S)        : Kaiser et al.

It is certified that error appears in the above-identified patent and that said Letters Patent is hereby corrected as shown below:

In Column 15, line 51, after "method", kindly replace "100" with --1100--.

In Column 21, line 3, after "wireless", kindly replace "stations$_i$," with --stations;--.

Signed and Sealed this

Seventh Day of February, 2012

David J. Kappos
*Director of the United States Patent and Trademark Office*